(12) United States Patent
Milosevic et al.

(10) Patent No.: US 8,965,588 B2
(45) Date of Patent: *Feb. 24, 2015

(54) DEVICES AND METHODS FOR DECENTRALIZED VOLTAGE CONTROL

(75) Inventors: Borka Milosevic, Atlanta, GA (US); Willem Hendrik Du Toit, Cochrane (CA); Aleksandar Vukojevic, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 678 days.

This patent is subject to a terminal disclaimer.

(21) Appl. No.: 13/191,420

(22) Filed: Jul. 26, 2011

(65) Prior Publication Data

US 2013/0030586 A1    Jan. 31, 2013

(51) Int. Cl.
| | | |
|---|---|---|
| *G06F 1/28* | (2006.01) | |
| *H02J 3/12* | (2006.01) | |
| *G06F 1/32* | (2006.01) | |
| *H02J 3/16* | (2006.01) | |
| *H02J 13/00* | (2006.01) | |

(Continued)

(52) U.S. Cl.
CPC ... *G06F 1/28* (2013.01); *H02J 3/12* (2013.01); *G06F 1/3203* (2013.01); *H02J 3/16* (2013.01); *H02J 13/0006* (2013.01); *H02J 3/1828* (2013.01); *H02J 2003/007* (2013.01); *Y02E 40/34* (2013.01); *Y04S 10/22* (2013.01); *Y04S 10/24* (2013.01); *Y02E 60/726* (2013.01); *Y04S 40/22* (2013.01); *Y02E 60/76* (2013.01); *Y02E 40/74* (2013.01)
USPC .......................................... 700/286; 700/292

(58) Field of Classification Search
None
See application file for complete search history.

(56) References Cited

U.S. PATENT DOCUMENTS

| | | |
|---|---|---|
| 3,754,184 A | 8/1973 | Stone |
| 3,872,286 A | 3/1975 | Putman |

(Continued)

FOREIGN PATENT DOCUMENTS

| | | |
|---|---|---|
| EP | 1071185 | 1/2001 |
| WO | WO2008025162 | 3/2008 |

OTHER PUBLICATIONS

Pimpa et al. "Voltage Control in Power System Using Expert System Based on SCADA System" IEEE Power Engineering Society Winter Meeting, 2002, pp. 1282-1286.*

(Continued)

*Primary Examiner* — Sean Shechtman
*Assistant Examiner* — Steven Garland
(74) *Attorney, Agent, or Firm* — Fletcher Yoder, P.C.

(57) ABSTRACT

Devices and methods for the decentralized, coordinated control of the voltage of an electrical distribution system are provided. For example, a controller may include a network interface and data processing circuitry. The network interface may receive first measurements associated with a segment of an electrical distribution system and transmit a control signal configured to control equipment of the segment of the electrical distribution system. The data processing circuitry may run digital simulations of the segment of the electrical distribution system in various equipment configurations, selecting from among the various equipment configurations an equipment configuration that is expected to cause the voltage deviation of the segment to approach a desired value. The data processing circuitry then may generate the control signal, which may cause the equipment of the segment of the electrical distribution system to conform to the equipment configuration.

20 Claims, 24 Drawing Sheets

(51) Int. Cl.
*H02J 3/18* (2006.01)
*H02J 3/00* (2006.01)

(56) References Cited

U.S. PATENT DOCUMENTS

| | | | |
|---|---|---|---|
| 4,234,843 A | 11/1980 | Gyugyi et al. |
| 4,313,081 A | 1/1982 | Smith |
| 4,413,189 A | 11/1983 | Bottom, Jr. |
| 4,419,619 A | 12/1983 | Jindrick et al. |
| 4,449,054 A | 5/1984 | Jop |
| 4,630,220 A | 12/1986 | Peckinpaugh |
| 4,677,364 A | 6/1987 | Williams et al. |
| 4,695,737 A | 9/1987 | Rabon et al. |
| 4,769,587 A | 9/1988 | Pettigrew |
| 4,857,821 A | 8/1989 | Takeda |
| 4,891,569 A | 1/1990 | Light |
| 4,916,377 A | 4/1990 | Terada et al. |
| 4,974,140 A | 11/1990 | Iba et al. |
| 4,999,565 A | 3/1991 | Nilsson |
| 5,099,190 A | 3/1992 | Sato |
| 5,117,175 A | 5/1992 | Pettigrew et al. |
| 5,134,356 A | 7/1992 | El-Sharkawi et al. |
| 5,422,561 A | 6/1995 | Williams et al. |
| 5,539,653 A | 7/1996 | Pomatto |
| 5,541,498 A | 7/1996 | Beckwith |
| 5,594,659 A | 1/1997 | Schlueter |
| 5,610,834 A | 3/1997 | Schlueter |
| 5,670,864 A | 9/1997 | Marx et al. |
| 5,734,586 A | 3/1998 | Chiang et al. |
| 5,760,492 A | 6/1998 | Kanoi et al. |
| 5,796,628 A | 8/1998 | Chiang et al. |
| 5,798,634 A | 8/1998 | Terada et al. |
| 5,896,302 A | 4/1999 | Goodpaster |
| 5,900,723 A | 5/1999 | Rostron |
| 5,963,457 A | 10/1999 | Kanoi et al. |
| 5,999,430 A | 12/1999 | Aritsuka |
| 6,005,759 A | 12/1999 | Hart et al. |
| 6,058,353 A | 5/2000 | Goodpaster |
| 6,297,940 B1 | 10/2001 | Wu |
| 6,452,289 B1 | 9/2002 | Lansberry et al. |
| 6,492,801 B1 | 12/2002 | Sims et al. |
| 6,549,880 B1 | 4/2003 | Willoughby et al. |
| 6,625,520 B1 | 9/2003 | Chen et al. |
| 6,633,823 B2 | 10/2003 | Bartone et al. |
| 6,653,821 B2 | 11/2003 | Kern et al. |
| 6,745,109 B2 | 6/2004 | Kojima et al. |
| 6,772,052 B1 | 8/2004 | Amundsen et al. |
| 6,906,434 B1 | 6/2005 | Koeppe et al. |
| 6,915,185 B2 | 7/2005 | Yamamoto et al. |
| 6,925,362 B2 | 8/2005 | Machitani et al. |
| 6,987,331 B2 | 1/2006 | Koeppe et al. |
| 7,002,260 B2 | 2/2006 | Stahlkopf |
| 7,069,117 B2 | 6/2006 | Wilson et al. |
| 7,091,703 B2 | 8/2006 | Folts et al. |
| 7,288,921 B2 | 10/2007 | Huff et al. |
| 7,398,194 B2 | 7/2008 | Evans et al. |
| 7,423,412 B2 | 9/2008 | Weng et al. |
| 7,474,080 B2 | 1/2009 | Huff et al. |
| 7,584,066 B2 | 9/2009 | Roytelman |
| 7,595,563 B2 | 9/2009 | Wobben |
| 7,626,497 B2 | 12/2009 | Mollenkopf |
| RE41,170 E | 3/2010 | Hubert et al. |
| 7,714,592 B2 | 5/2010 | Radtke et al. |
| 7,783,390 B2 | 8/2010 | Miller |
| 7,804,280 B2 | 9/2010 | Deaver, Sr. et al. |
| 2008/0177678 A1 | 7/2008 | Di Martini et al. |
| 2008/0195255 A1 | 8/2008 | Lutze et al. |
| 2009/0024255 A1 | 1/2009 | Penzenstadler et al. |
| 2009/0033296 A1 | 2/2009 | Hammerstrom |
| 2009/0265042 A1 | 10/2009 | Mollenkopf et al. |
| 2010/0204851 A1 | 8/2010 | Yuen et al. |
| 2010/0268579 A1* | 10/2010 | Momoh ............... 705/14.1 |
| 2011/0106321 A1* | 5/2011 | Cherian et al. ............ 700/286 |
| 2012/0022713 A1* | 1/2012 | Deaver et al. ............ 700/298 |

OTHER PUBLICATIONS

U.S. Appl. No. 13/191,422, filed Jul. 26, 2011, Borka Milosevic et al.
U.S. Appl. No. 13/191,415, filed Jul. 26, 2011, Borka Milosevic et al.
U.S. Appl. No. 13/191,409, filed Jul. 26, 2011, Borka Milosevic et al.
U.S. Appl. No. 13/191,400, filed Jul. 26, 2011, Borka Milosevic et al.
Wan, Hui, et al.; "Multi-Agent Application of Substation Protection Coordination with Distributed Generators,"; IEEE, K. K.Li, pp. 1-6, Nov. 2005.
Daneshfar, Fatemeh, et al.; "Multi-Agent Systems in Control Engineering: A Survey,"; Hindawi Publishing Corporation, Journal of Control Science and Engineering, vol. 2009, Article ID 531080, 12 pgs, 2009.
Feliachi, A.; "Optimal Decentralized Load Frequency Control," IEEE vol. PWRS-2, No. 2, pp. 379-385 (May 1987).

* cited by examiner

DEVICES AND METHODS FOR DECENTRALIZED VOLTAGE CONTROL

BACKGROUND

The subject matter disclosed herein relates to decentralized, coordinated control of equipment associated with an electrical distribution system to optimize voltage to reduce power consumption.

Electrical power provided over an electrical distribution system typically must remain within a range of acceptable voltages (e.g., ±5% of 120V, or between approximately 114V and 126V). In an effort to keep the voltages of the electrical distribution system within such a range, a variety of equipment may be placed throughout the distribution system. This equipment may include, for example, a load tap changing (LTC) transformer, voltage regulators, and distribution capacitor banks. Conventionally, each of these may be regulated according to a distributed control scheme, in which a local controller may individually control each piece of equipment. While a distributed control scheme may keep the voltage of the electrical distribution system within the prescribed limits, it may not optimize other operational parameters, such as active power losses, power factor, and/or the flatness of the voltage across a segment of the electrical distribution system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a controller may include a network interface and data processing circuitry. The network interface may receive first measurements associated with a segment of an electrical distribution system and transmit a control signal configured to control equipment of the segment of the electrical distribution system. The data processing circuitry may run simulations of the segment of the electrical distribution system in various equipment configurations, selecting from among the various equipment configurations an equipment configuration that is expected to cause the voltage deviation of the segment to approach a desired value (e.g., to be minimized). The data processing circuitry then may generate the control signal, which may cause the equipment of the segment of the electrical distribution system to conform to the equipment configuration.

In a second embodiment, a method for controlling first and second segments of an electrical distribution system while the first segment is providing power to a recovered portion of the second segment, using respective first and second application platforms, may include running a voltage control function on the second segment using the second application platform, while the second application platform is running the voltage control function on the second segment, running a violation check function on the first segment using the first application platform, and after running the voltage control function on the second segment using the second application platform, running the voltage control function on the first segment using the first application platform. The voltage control functions may cause a voltage deviation of the segments to respectively approach a desired value, and the violation check function may prevent or mitigate a voltage violation on the first segment.

In a third embodiment, an article of manufacture includes one or more tangible, machine-readable storage media having instructions encoded thereon for execution by a processor of an electronic device. These instructions may include instructions to receive measurements associated with a feeder of an electrical distribution system and instructions to simulate a distribution power flow on the feeder or use approximate equations according to various capacitor switching configurations of at least one capacitor of the feeder using these measurements. In addition, the instructions may include instructions to determine an expected voltage deviation, reduction in power loss, and power factor on the feeder associated with the various capacitor switching configurations based at least in part on the simulated distribution power flow on the feeder or by using the approximate equations, instructions to select a non-dominated capacitor switching configuration from among the various capacitor switching configurations, and instructions to control capacitors of the feeder according to the non-dominated capacitor switching configuration, thereby controlling the voltage deviation of the feeder.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
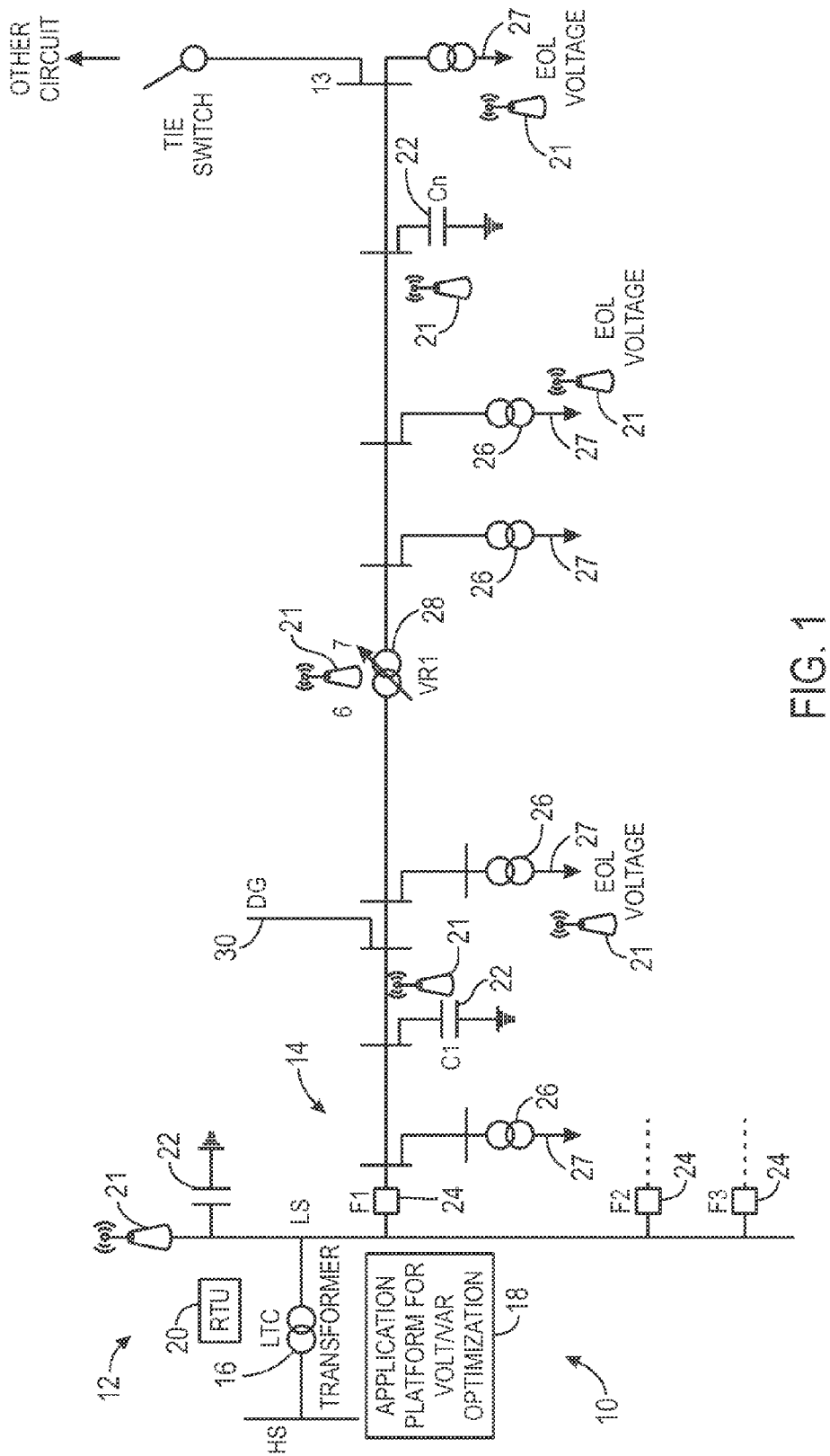
FIGS. 1 and 2 are one-line drawings of an electrical distribution system that can be optimized for voltage via decentralized coordinated control, in accordance with an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure relate to techniques for controlling equipment on segments of an electrical distribution system via decentralized coordinated control. As used herein, the term "decentralized coordinated control" refers to a decentralized manner of controlling electrical distribution system equipment (e.g., load tap changing (LTC) transformers, voltage regulators, and/or distribution capacitor banks) using an application platform for Volt/VAR optimization located at the substation level and not in a utility back office. That is, rather than allowing each piece of equipment of the electrical distribution system to operate independently according to a distributed control scheme, the application platform for Volt/VAR optimization may control many pieces of equipment in a segment of the electrical distribution system in a coordinated manner. This decentralized coordinated control may be used to optimize various operational parameters of the electrical distribution system, including, among other things, the voltage of the electrical distribution system. As used herein, the term "optimize" means to generally improve over conventional, local control schemes. Thus, when a segment of an electrical distribution system is optimized for voltage, the segment of the electrical distribution system may be understood to have a voltage better than would generally be obtained using conventional, local control schemes. The terms "optimize" or "optimization" do not mean that no other, better values of power factor are possible, only that these values are improved or more closely approach a desired value than conventional control schemes (e.g., a desired voltage deviation).

A segment of an electrical distribution system may include a feeder supplied with power by a substation. Accordingly, as will be discussed below, the application platform for Volt/VAR optimization may optimize certain parameters (e.g., voltage or voltage deviation) at the substation level and/or the feeder level. In addition, using the same general techniques, the application platform for Volt/VAR optimization may even optimize voltage on a segment of an electrical distribution system that has been restored after a fault.

Figure 2:
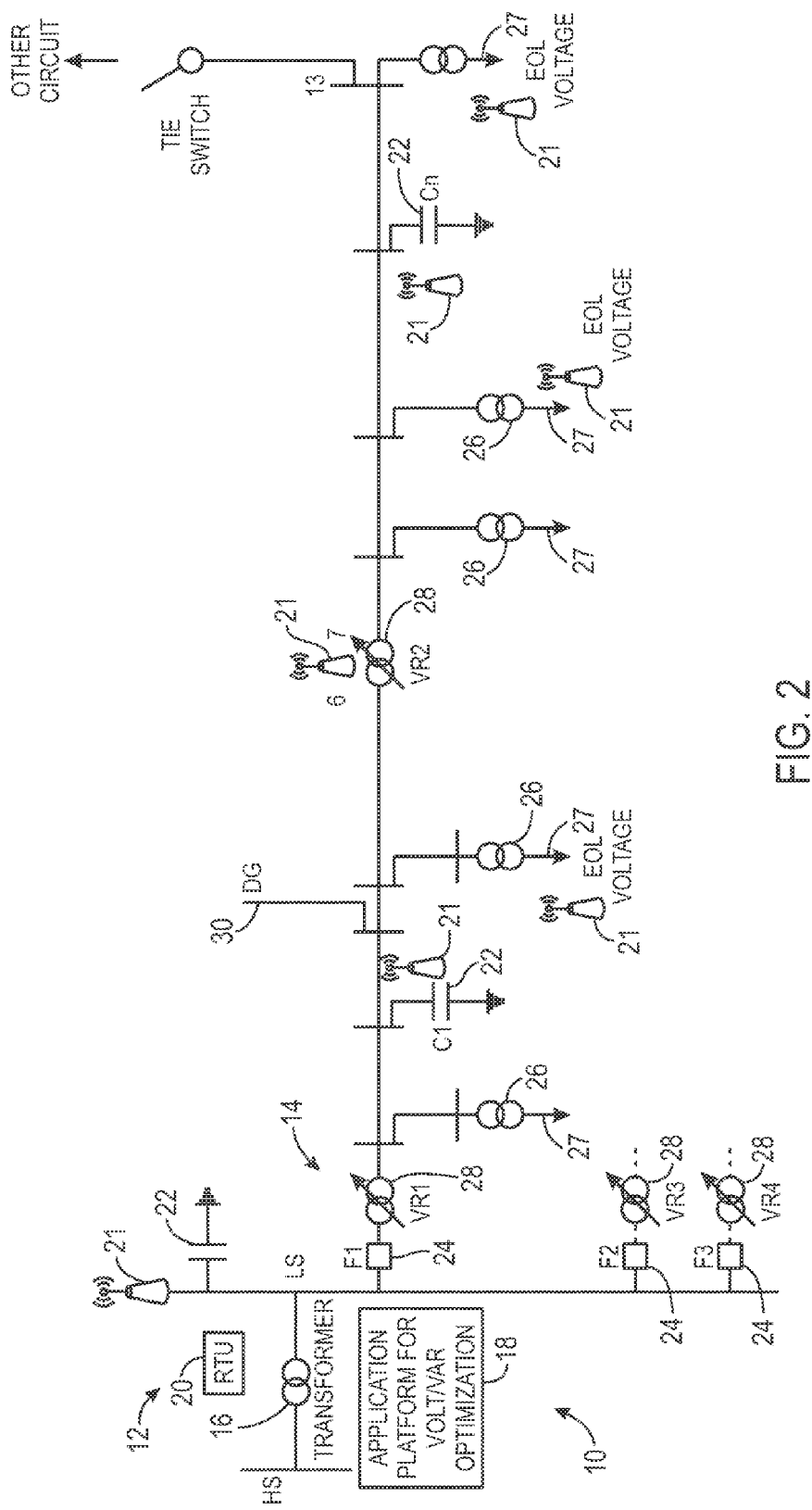

FIGS. 1 and 2 represent two respective embodiments of segments of an electrical distribution system 10 that can be optimized for voltage using the decentralized coordinated control techniques described herein. In FIG. 1, a substation 12 feeds power directly to feeders 14 via a load tap changing (LTC) transformer 16. In contrast, in FIG. 2, the substation 12 provides power to the feeders 14 via transformer without LTC and respective voltage regulators (VRs) 28. In either embodiment, a application platform 18, which may be associated with and/or located at the substation 12, can optimize the electrical distribution system 10 for voltage according to the decentralized coordinate control techniques discussed herein. Moreover, although the following discussion refers to FIG. 1 in particular, any discussion of like elements of the embodiment of FIG. 1 should be understood as generally applicable to the embodiment of FIG. 2.

As noted above, FIG. 1 is a one-line diagram of the substation 12 that may supply power to the feeders 14 of the electrical distribution system 10. The substation 12 may include, for example, a load tap changing (LTC) transformer 16 that transforms high side (HS) voltage to a low side (LS) voltage within a defined range (e.g., so that the voltage on the feeder is within 120V±5% (between 114V and 126V)). A application platform 18 associated with the substation 12 may perform decentralized coordinated control of various equipment at the substation 12 or the feeder 14, communicating with this equipment in any suitable way (e.g., substation antenna 20). The application platform may optimize the voltage of the substation 12 by controlling, alone or among other things, the operation of the LTC transformer 16 and/or distribution capacitor banks 22. These distribution capacitor banks 22 are also referred to herein as capacitors 22. When a capacitor 22 is on (e.g., closed), some amount of reactive power (VAR) may be injected into the feeder 14 through the capacitor 22. By varying which capacitors 22 are switched on or off, the amount of reactive power may vary. Consequently, operational parameters of the electrical distribution system 10, such as power factor, active power losses, voltage deviation over the length of the feeder 14, and so forth, may vary.

As shown in FIGS. 1 and 2, each feeder 14 supplies power to various distribution transformers 26 to loads 27. These loads 27 may draw varying amounts of real power (W) and reactive power (VAR). Feeder power factor and voltage profile depend on the amount of active and reactive power load on the feeder 14. To provide one brief example, power factor (i.e., the ratio of real power to total power drawn) on the feeders 14 may be low in the summertime because many of the loads 27 may be highly reactive induction motors for air conditioning. As the voltage across a feeder 14 drops or rises, LTC (or voltage regulators (VRs) 28 alternately) may transform the voltage across the length of the feeder 14 to keep the voltages within the defined range (e.g., between 114V and 126V). The voltage regulators (VRs) 28 each may include a selectable tap positions that can be controlled from the application platform 18. These different tap positions may cause a voltage regulator (VR) 28 to increase or decrease the voltage on its low side (LS) bus to a different degree. Distributed generation (DG) 30 may inject power into the feeder 14, effectively acting as an inverse load 27.

Figure 3:
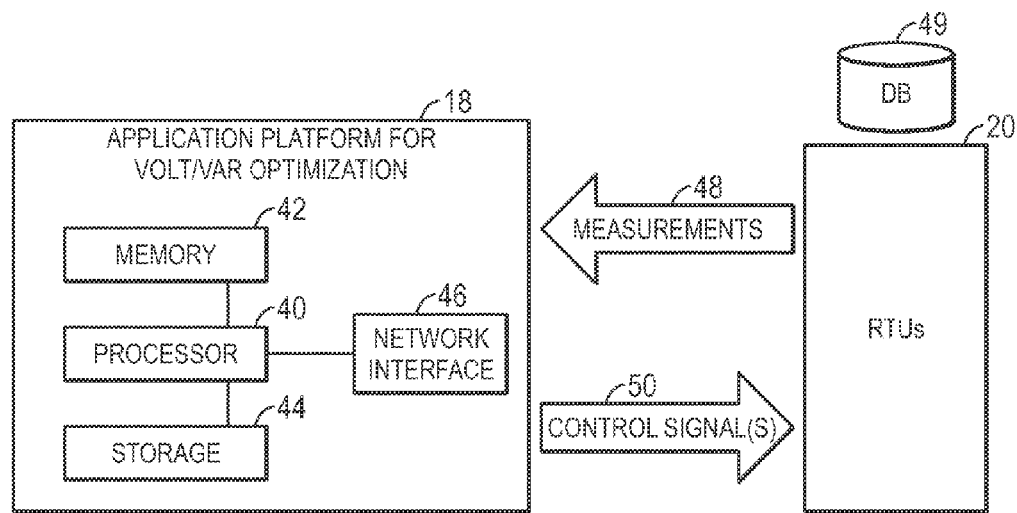
FIG. 3 is a block diagram of a application platform of a substation that can optimize voltage of the electrical distribution system of FIGS. 1 and/or 2 via decentralized coordinated control, in accordance with an embodiment.

As mentioned above, to manage certain operational parameters of the electrical distribution system 10 (e.g., the voltage on the electrical distribution system 10), the application platform 18 may control the distribution capacitor banks 22 and voltage regulators (VRs) 28 of the feeders 14 and/or the LTC transformer 16 of the substation 12. An application platform for Volt/VAR optimization 18, an example of which appears in FIG. 3, may perform various algorithms to determine a configuration for the various equipment of the electrical distribution system 10 that may optimize the voltage. Although the application platform for Volt/VAR optimization 18 is shown in FIG. 3 to be at the substation 12, the application platform for Volt/VAR optimization 18 may instead be at any other suitable location in the electrical distribution system 10. The application platform for Volt/VAR optimization may include a processor 40, memory 42, and storage 44. Operably coupled to the memory 42 and/or the storage 44, the processor 40 may carry out the presently disclosed techniques based on instructions executable by the processor 42. These instructions may be stored using any suitable article of manufacture that includes one or more tangible machine-readable media at least collectively storing these instructions. The memory 42 and/or the nonvolatile storage 44 may represent such articles of manufacture capable of storing these instructions, and may include, for example, random-access memory, read-only memory, rewritable flash memory, a hard drive, and/or optical discs.

A network interface 46 may receive a variety of measurements 48 from the field devices directly or through the remote terminal units (RTUs) 20. Using these measurements, the application platform for Volt/VAR optimization 18 may simulate the feeders 14 in a variety of equipment configurations (e.g., distribution capacitor bank 20 switching configurations and/or LTC or voltage regulator (VR) 28 tap positions). Based at least partly on these simulations, the application platform for Volt/VAR optimization 18 may generate control signals 50 for controlling the equipment substation 12 and/or feeders 14 to optimize the voltage.

The application platform for Volt/VAR optimization 18 may follow a general set of guidelines in carrying out the voltage optimization techniques disclosed herein. In particular, the control signals 50 from the application platform for Volt/VAR optimization 18 may control the capacitors 22 and voltage regulators (VRs) 28 installed along the length of the feeder 14, and/or the capacitors 22 and the LTC transformer 16 and/or voltage regulators (VRs) 28 installed at the substation 12. To aid in simulation, geographical information for each feeder 14 may be known by the application platform for Volt/VAR optimization 18, and all available measurements 48 from the equipment of the substation 12 and feeders 14 may include some indication of the time the measurements 48 were taken (e.g., the measurements 48 may be time-stamped). As will be discussed below, these measurements 48 can be used by the application platform for Volt/VAR optimization 18 to calculate unknown voltages and current at nodes of the feeders 14. In addition, to aid certain other application platforms for Volt/VAR optimization 18 that are controlling other feeders 14 of the electrical distribution system 10, the application platform for Volt/VAR optimization 18 may "publish" the minimum and maximum voltage and the equivalent impedance of each of the feeders 14 under its control to these other application platforms for Volt/VAR optimization 18. Moreover, when the application platform for Volt/VAR optimization 18 is controlling a substation 12 and feeders 14, the application platform for Volt/VAR optimization 18 may not change the status or settings of the equipment of the substation 12 and the feeders 14 at the same. Furthermore, the application platform for Volt/VAR optimization 18 may control the voltage regulators (VRs) 28 and distribution capacitor banks 22 unless communication to the voltage regulators (VRs) 28 and distribution capacitor banks 22 fails. When communication fails, the voltage regulators (VRs) 28 and distribution capacitor banks 22 revert back to their local settings. Otherwise, the voltage regulators (VRs) 28 and distribution capacitor banks 22 will remain under the control of the application platform for Volt/VAR optimization 18. Finally, when the application platform for Volt/VAR optimization 18 begins to carry out voltage optimization, the voltage regulator (VRs) 28 taps will initially be locked in their most recent position.

It should be noted that application platform for Volt/Var optimization 18 can control the capacitor banks 22 and/or voltage regulators (VRs) 28 in a variety of ways. For example, the application platform for Volt/Var optimization 18 may send settings to appropriate device controllers that can control the devices. Additionally or alternatively, the application platform for Volt/Var optimization 18 may send commands to the capacitor banks 22 and/or voltage regulators (VRs) 28 (e.g., TRIP/CLOSE for a capacitor bank 22 and RAISE/LOWER for the LTC transformer 16 or voltage regulator (VR) 28). It may be appreciated that sending commands to a voltage regulator (VR) 28 in the field may be slow at times, and thus it may be more desirable to send changes in settings to the appropriate device controllers. In the present disclosure, both the direct issuing of commands to feeder 14 equipment and the changing of settings may be referred to as providing or issuing a control signal or a command.

The application platform for Volt/VAR optimization 18 may follow the above guidelines at least partly by relying on the measurements 48. A general minimum set of measurements 48 may be given as follows: (1) voltage (magnitude) at the substation 12 low side (LS) bus, (2) voltage (magnitude) at capacitor 22 locations, (3) voltage (magnitude) at low side (LS) locations of voltage regulators (VR) 28 and their tap positions, (4) kW and kVAr flows at capacitor 22 locations and all junction points (e.g., points at which a lateral is connected to a main feeder 14) between capacitor 22 and voltage regulator (VR) 28 locations and the substation 12, (5) kW and kVAr at the substation 12 low side (LS) bus and kW and kVAr measurements from each feeder 14 (alternatively, kW and kVAr measurements from each feeder 14 and transformer 16 test data may be used to calculate kW and kVAr a the substation 12 high side (HS) bus), (6) kW and kVAr demand from each large commercial and/or industrial load 27 between the substation 12 and any of the capacitors 22, and (7) end of line (EOL) voltages (if unavailable, the voltage drop between the last measurement point and the end of the feeder 14 may otherwise be provided in another manner). In addition, it should be noted that if the feeders 14 have any distributed generation (DG) 30, additional voltage measurement points may be needed because the minimum voltage of the feeder 14 may not be the end of line (EOL) voltage. Additionally or alternatively, the voltages on the feeder 14 may be estimated using approximate equations. For such an approach, the impedance of the feeder 14 would need to be known or estimated As mentioned above, the application platform for Volt/VAR optimization 18 may optimize voltage based at least in part on a simulation of the distribution power flow across the electrical distribution system 10. Equivalent circuit diagrams and one-line diagrams represented by FIGS. 4-12, discussed below, generally illustrate the basis upon which the application platform for Volt/VAR optimization 18 may perform this simulation of the distribution power flow across portions of the electrical distribution system 10. Although the equivalent circuits of FIGS. 4-12 represent approximations of actual segments of the electrical distribution system 10, these approximations are believed to simulate segments of the electrical distribution system 10 with sufficient accuracy to enable the application platform for Volt/VAR optimization 18 to optimize voltage profile in the electrical distribution system 10.

Figure 4:
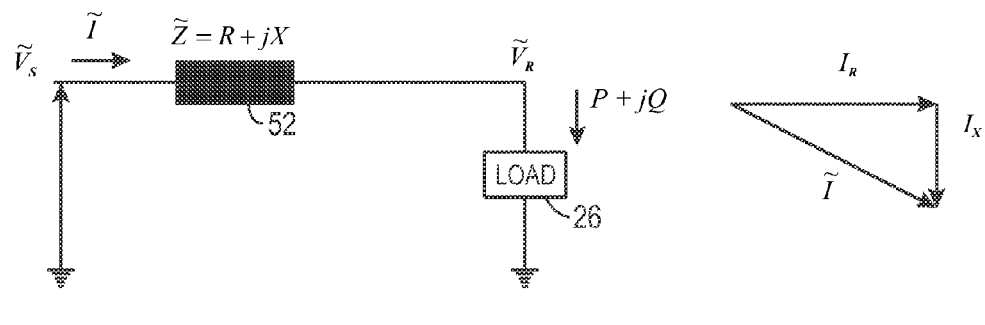
FIGS. 4-8 represent equivalent circuits modeling segments of the electrical distribution system of FIGS. 1 and/or 2, in accordance with an embodiment.

FIG. 4 presents a line-to-neutral equivalent circuit modeling a feeder 14 with a line segment with impedance 52. In the equivalent circuit of FIG. 4, this feeder 14 serves load 27, here represented as a single equivalent load. Kirchhoff's Voltage Law applied to the circuit of FIG. 4 gives the following:

$$\tilde{V}_S = \tilde{V}_R + \tilde{Z}\tilde{I}$$

where $\tilde{Z}=R+jX$ is the impedance 52 of the line segment. The current vector $\tilde{I}$ appears in FIG. 4 alongside the equivalent circuit, and represents the sum of both real and reactive current components $\tilde{I}=I_R+jI_X$. The voltage drop, $V_{drop}$, across the line segment is defined as a difference between the magnitudes of the source voltage $\tilde{V}_S$ and the load voltage $\tilde{V}_R$:

$$\Delta V_{drop} = |\tilde{V}_S| - |\tilde{V}_R|.$$

Figure 5:
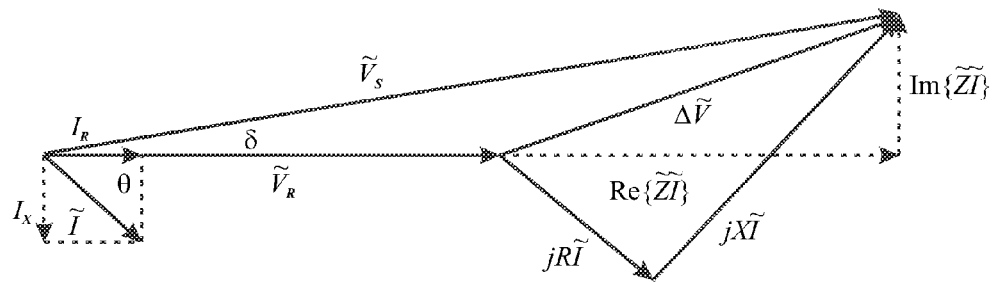

Because of the small phase angle difference between the source voltage $\tilde{V}_S$ and the load voltage $\tilde{V}_R$, as illustrated in a phasor diagram of FIG. 5, the voltage drop between the source and load voltage is approximately equal to the real part of the voltage drop across the impedance $\tilde{Z}$, or $\Delta \tilde{V} = \tilde{Z}\tilde{I}$:

$$\Delta V_{drop} \approx Re\{\tilde{Z}\tilde{I}\} = RI_R + XI_X,$$

where $\tilde{I}=I_R+jI_X$.

The voltage drop $\Delta V_{drop}$ is a function of both R and X, where R is mostly a function of wire size and X is mostly a function of the conductor spacing. In the electrical distribution system 10, the ratio of ratio of X/R generally may be greater than 2. It therefore may be noted that the voltage drop $\Delta V_{drop}$ across a feeder 14 of the electrical system 10 could be reduced by using larger, and usually more expensive, wires to lower the value of R, or by installing capacitors 22 to reduce the flow on reactive power (VAR).

Figure 6:
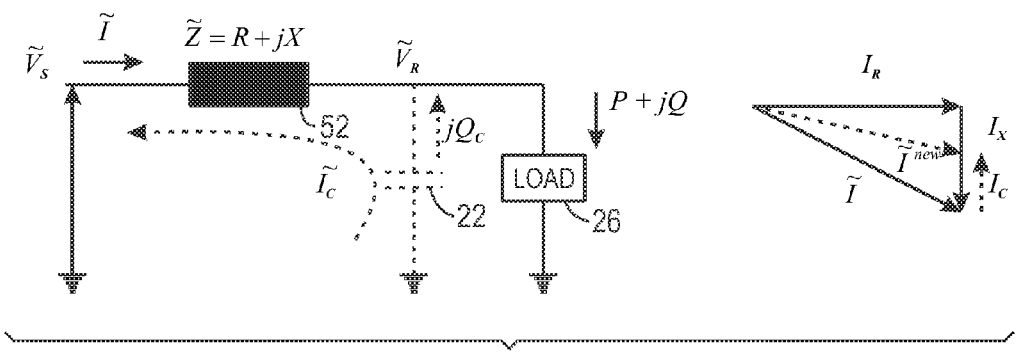

Indeed, as noted above, the electrical distribution system 10 may include a variety of capacitors 22. Strategically switching these capacitors 22 on or off can effectively reduce the flow on reactive power through the feeder 14. An equivalent circuit representing a feeder 14 having a shunt capacitor 22 appears in FIG. 6. When the shunt capacitor 22 is on, the shunt capacitor 22 will inject a current, $I_C$, that reduces the imaginary component of the current, $I_X$, and, accordingly, the magnitude of the total current I. The reduction of the imaginary component of the current $I_X$ flowing through the line segment will effectively reduce the amount of voltage drop $\Delta V_{drop}$ across the line segment. For the equivalent circuit shown in FIG. 6, the voltage drop $\Delta V_{drop}$ may be given as:

$$\Delta V_{drop} \approx RI_R + X(I_X - I_C),$$

and the voltage rise of the circuit of FIG. 6 may be given as:

$$\Delta V_{rise} \approx XI_C.$$

It should be understood that the equation above may approximate the effect of a capacitor 22 switching on the feeder 14 voltage profile. From this equation, it may be seen that if the capacitor 22 is the capacitor is oversized (i.e., $I_X - I_C < 0$), the system may be overcompensated and the voltage drop in the line segment $\Delta V_{drop}$ may become negative. Consequently, the load voltage, $V_R$, may become higher than the source voltage, $V_S$. This condition may occur if capacitors 22 installed on the feeder 14 were not adequately located or sized, or when certain sections of the feeder 14 need to be overcompensated to achieve better voltage flattening along the feeder 14 and its laterals. The effect of switching the capacitor 22 on or off in the circuit of FIG. 6 may also effect power losses. The active power loss on the line segment of the circuit of FIG. 6 while the capacitor 22 is switched off (e.g., the condition illustrated by FIG. 4), may depend on the impudence 52 of the line segment and the square of the current, I, flowing through it:

$$P_{loss} = RI^2 = R(I_R^2 + I_X^2)$$

These active power losses can also be calculated as:

$$P_{loss} = \frac{R}{V_R^2}(P^2 + Q^2) \text{ or } P_{loss} = \Delta V^2 \frac{R}{Z^2} \approx \Delta V_{drop}^2 \frac{R}{Z^2}$$

Switching on the shunt capacitor 22 in the circuit of FIG. 6 may reduce a power loss component of the line segment due to the reactive power flow, Q, (and the imaginary component of the current, $I_X$), consequently reducing the total power loss, as represented by the following relationship:

$$P_{loss}^{new} = R(I_R^2 + (I_X - I_C)^2), \text{ or}$$

$$P_{loss}^{new} = \frac{R}{V_R^2}(P^2 + (Q - Q_C)^2), \text{ or}$$

$$P_{loss} \approx (\Delta V_{drop} - \Delta V_{rise})^2 \frac{R}{Z^2}.$$

Changes in the real power loss P loss of the line segment due to reactive compensation in the circuit can be calculated as:

$$\Delta P_{loss} \approx RI_X^2 - R(I_X - I_C)^2.$$

Here, it may be noted that if the capacitor 22 is oversized (i.e., $I_X - I_C < 0$), the circuit of FIG. 6 may be overcompensated. Likewise, the losses in the circuit will increase if $I_C > 2I_X$. The equation below may be used to approximate the effect of a capacitor 22 switching on the active losses of the feeder 14:

$$\Delta P_{LOSS} = \sum_{i,j} \left( R_{i,j} I_{X_{i,j}}^2 - R_{i,j} (I_{X_{i,j}} - I_{C_k})^2 \right),$$

where $R_{i,j}$ is a resistance of the line segment between nodes i and j, $I_{X_{i,j}}$ is the imaginary component of the current on the line segment between nodes i and j, and $I_{C_k}$ is the current of capacitor k.

The power factor of a feeder 14 may also be affected by a capacitor 22. Namely, since power factor depends on the shift between the voltage and current phasors (e.g., as illustrated in FIG. 5), the power factor of the substation 12 or feeder 14 may vary when a capacitor 22 is switched on or off. Indeed, as shown by the phasor representation of FIG. 5, when voltage and current fall farther apart in terms of phase angle θ, (i.e., as power factor worsens), a larger percentage of the power flow is reactive (VAR) rather than real (W). Power factor may be represented according to the following relationship:

$$pf = \cos(\theta) = \frac{P}{\sqrt{P^2 + Q^2}}.$$

Typically, the power factor may be lagging (i.e., the current phasor may be "behind" the voltage phasor). From the equation above, it is apparent that power factor may be a fraction ranging from 0 to 1. For example, a power factor of 1 means that there is no reactive power flowing in the circuit, while a power factor of 0.9 means that 10% of the power is lost due to reactive effects. It should be noted that during summer, power factor on a feeder 14 may be relatively low because of the high reactive load of air conditioning induction motors during peak loading time. Off-season, both real and reactive loads are typically far below their summer values, and VAR loads lessen more than active power, so power factor on a feeder 14 may improve considerably at these times.

Since, as noted above, capacitors 22 switched on may inject opposing reactive power (VARs) into the system, as generally shown in FIG. 6, switching on such a capacitor 22 may affect the power factor of a feeder 14 and/or a substation 12. A new power factor PF new that occurs when a capacitor 22 is switched may be modeled according to the following equation:

$$pf^{new} = \frac{P - \Delta P_{LOSS}}{\sqrt{(P - \Delta P_{LOSS})^2 + (Q - \Delta Q_{LOSS} - Q_C)^2}} \approx \frac{P}{\sqrt{P^2 + (Q - Q_C)^2}},$$

where $\Delta P_{LOSS}$ is the total active power loss reduction on the feeder 14. This total active power loss reduction may be calculated as follows:

$$\Delta P_{LOSS} = \sum_{i,j} \Delta P_{loss_{i,j}},$$

where i,j refer to a line segment in the electrical distribution system 10 between two nodes i and j.

Likewise, $\Delta Q_{LOSS}$ represents the total reactive power loss reduction on the feeder 14, and may be calculated according to the following relationship:

$$\Delta Q_{LOSS} = \sum_{i,j} \Delta Q_{loss_{i,j}},$$

where i,j refer to a line segment between two nodes i and j in the electrical distribution system 10.

This reactive power loss reduction, $\Delta Q_{loss}$, may be calculated according to the following equation:

$$\Delta Q_{loss_{i,j}} = X_{i,j} I_{X_{i,j}}^2 - X_{i,j} (I_{X_{i,j}} - I_{C_k}),$$

where $X_{i,j}$ is a reactance of the line segment between nodes i and j, $I_{X_{i,j}}$ is the imaginary component of the current on the line segment between buses i and j and $I_{C_k}$ is the current of capacitor k.

Figure 7:
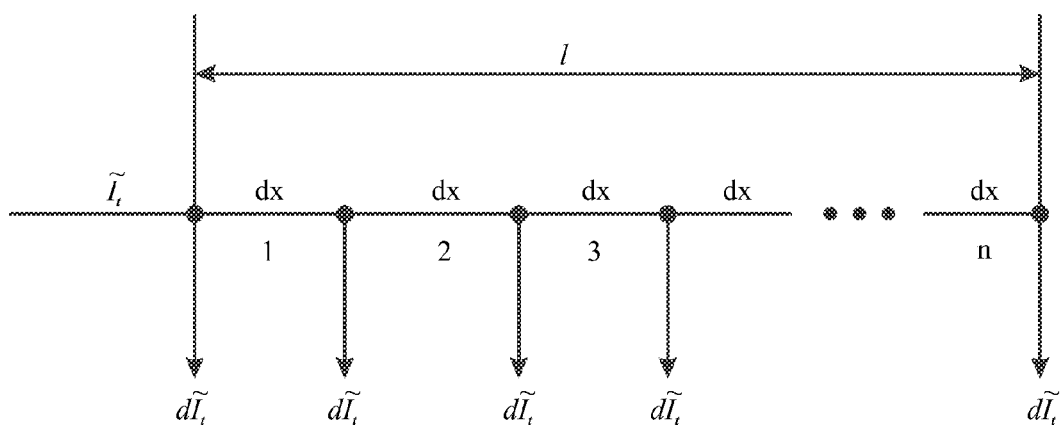

A feeder 14 may seldom have only one load 27, as illustrated in FIGS. 4-6. As such, when the application platform 18 simulates the feeder 14, the application platform 18 may undertake additional calculations. When the loads 27 are uniformly distributed (e.g., same rating distribution load tap changing (LTC) transformers 16 spaced uniformly over a length of a lateral segment of the electrical distribution system 10), as schematically represented in FIG. 7, it may not be necessary to model each load 27 to determine the total voltage drop from source to end over a length L. Under such conditions, the total voltage drop along a feeder 14 may be given as:

$$\Delta V_{drop}^{total} = \text{Re}\left\{ \frac{1}{2} \tilde{Z} \tilde{I}_t \left( 1 + \frac{1}{n} \right) \right\},$$

where $\tilde{Z} = R + jX$ represents the total per phase impedance from the source to the end of the line and $\tilde{I}_t$ represents the total current into the feeder 14. If the number of nodes is assumed to go to infinity, the total three-phase power losses may be given by the following relationship:

$$V_{drop}^{total} = \text{Re}\left\{ \frac{1}{2} \tilde{Z} \tilde{I}_t \right\}.$$

Total three-phase power losses thus may be given as:

$$P_{loss}^{total} = 3RI_t^2 \left( \frac{1}{3} + \frac{1}{2n} + \frac{1}{6n^2} \right).$$

Accordingly, if the number of nodes of the feeder 14 goes to infinity, the three-phase power losses may be calculated according to the following relationship:

$$P_{loss}^{total} = RI_t^2.$$

Distribution Power Flow Simulation

Figure 8:
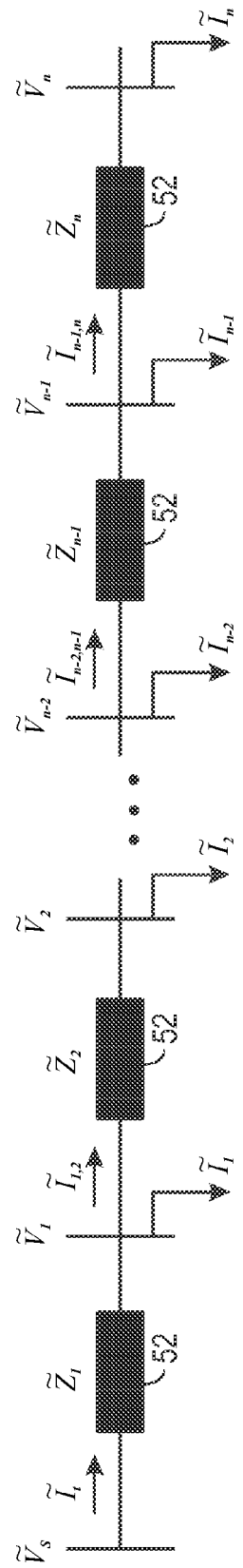

As will be discussed below, the application platform for Volt/VAR optimization 18 may perform a distribution power flow simulation to simulate the effect on a feeder 14 of various equipment configurations. By comparing various distribution power flow simulations for various equipment configurations, the application platform for Volt/VAR optimization 18 may determine which of these configurations optimize voltage of the feeder 14 and/or the substation 12. The application platform for Volt/VAR optimization 18 may calculate the distribution power flow on a distribution feeder 14 using backward/forward sweep iterative methods or through approximation equations. For example, as shown by a line-to-neutral equivalent circuit of a feeder 14 shown in FIG. 8, given the voltage at the substation $\tilde{V}_S$, and a known load 27 model at each feeder 14 bus (e.g., involving constant complex power, constant impedance, constant current, or some combination thereof), a distribution power flow calculation may determine voltages at all other buses, $\tilde{V}_i$, where i=1, ..., n, as well as currents in each line section. The distribution power flow simulation may determine (1) power flow in each section of the feeder 14 (e.g., kW, kVAr, and pf), (2) power loss in each section and total power loss, (3), total feeder power input in kW and kVAr, and (4) load kW and kVAr based on a specified model of the load 27.

The application platform for Volt/VAR optimization 18 may perform a distribution power flow analysis using a backward/forward sweep iterative method. In a backward sweep, Kirchoff's Current Law (KCL) and Kirchoff's Voltage Law (KVL) may be used to calculate voltage for each upstream bus of a line or transformer branch. After performing such a backward sweep, a voltage mismatch at the low side (LS) bus of the substation 12 may be calculated. If the voltage mismatch is greater than some tolerance, a forward sweep may be performed. In the forward sweep, Kirchoff's Voltage Law (KVL) may be used to compute the voltage for each downstream bus of the feeder 14, by using the specified source voltage, $V_S$, and the line currents determined in the previous backward sweep. This iterative process may continue until the error in the magnitude of the substation 12 voltage $V_S$ is within the tolerance.

Figure 28:
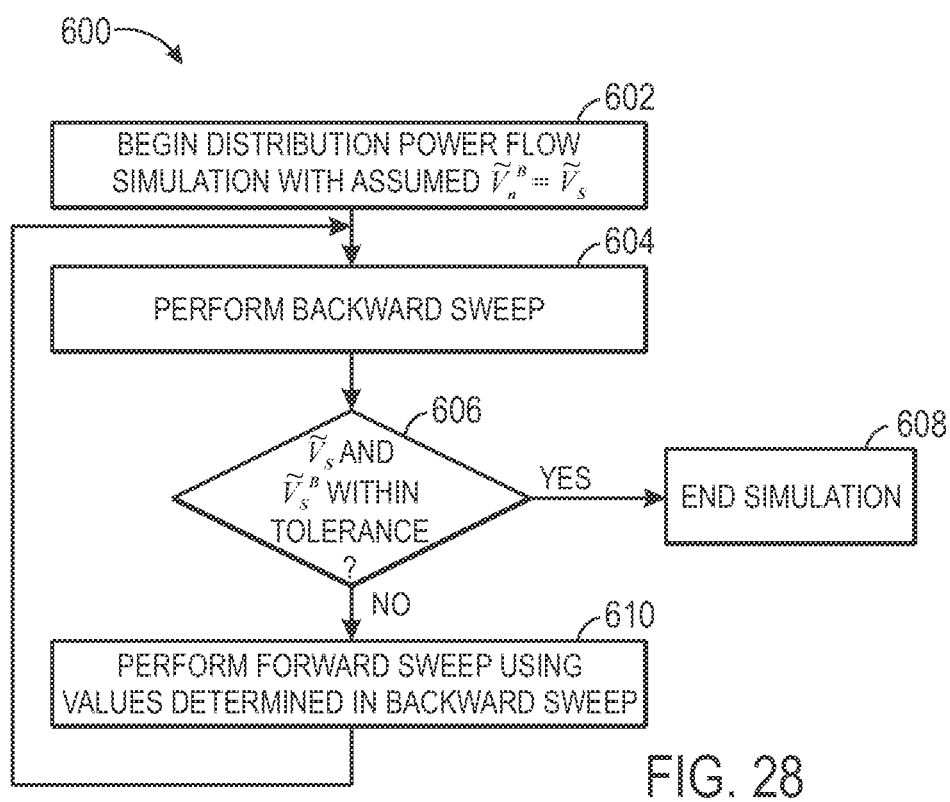
FIG. 28 is a flowchart describing an embodiment of a method for performing a distribution power flow simulation of a feeder of an electrical distribution system.

Determining the distribution power flow for a feeder 14 without laterals may occur as illustrated by a flowchart 600 of FIG. 28. The flowchart 600 may begin when the application platform for Volt/VAR optimization 18 sorts buses of the feeder 14 according to their distance to the substation 12 and initializes the end node voltage as $\tilde{V}_n^B = \tilde{V}_S$, where $\tilde{V}_S$ is the specified voltage at the substation bus LS and the superscript "B" stands for "backward sweep" (block 602). The application platform for Volt/VAR optimization 18 may start from the end bus and perform a backward sweep using KCL and KVL to calculate voltage of each upstream bus and the line currents (block 604). The backward sweep may take place as follows:

Calculate the load current at the end node, n, as:

$$\tilde{I}_n^B = \left(\frac{S_n^B}{\tilde{V}_n^B}\right)^*,$$

where $S_n^B = P_n^B + jQ_n^B$ is complex power at node n.
Apply KCL to calculate the current flowing from node n to n−1:

$$\tilde{I}_{n-1,n}^B = \tilde{I}_n^B.$$

Compute the voltage at node n−1 as:

$$\tilde{V}_{n-1}^B = \tilde{V}_n^B + \tilde{Z}_n \tilde{I}_{n-1,n}^B.$$

Calculate the load current at the node, n−1 as:

$$\tilde{I}_{n-1}^B = \left(\frac{S_{n-1}^B}{\tilde{V}_{n-1}^B}\right)^*.$$

Compute the current flowing from node n−2 to node n−1 as:

$$\tilde{I}_{n-2,n-1}^B = \tilde{I}_{n-1}^B + \tilde{I}_{n-1,n}^B.$$

Compute the voltage at node n−2:

$$\tilde{V}_{n-2}^B = \tilde{V}_{n-1}^B + \tilde{Z}_{n-1} \tilde{I}_{n-2,n-1}^B.$$

The procedure continues until the substation voltage is calculated.

$$\tilde{V}_S^B = \tilde{V}_1^B + \tilde{Z}_1 \tilde{I}_t^B,$$

where:

$$\tilde{I}_t^B = \sum_{i=1}^{n} \tilde{I}_i^B.$$

The application platform for Volt/VAR optimization 18 then may detect whether the difference between the specified and calculated voltages, $\tilde{V}_S$ and $\tilde{V}_S^B$ at the substation is less than the convergence tolerance, e (decision block 606):

$$\|\tilde{V}_S| - |\tilde{V}_S^B\| < \epsilon.$$

If the above relationship is true, the simulation may be understood to be reasonably accurate and the application platform for Volt/VAR optimization 18 may end its distribution power flow simulation (block 608). Otherwise, the application platform for Volt/VAR optimization 18 may perform a forward sweep using the specified source voltage, $\tilde{V}_S$, and the currents calculated in the backward sweep of block 604 (block 610). The forward sweep of block 610 may be carried out, for example, as follows:
A new voltage at node 1 is computed:

$$\tilde{V}_1^F = \tilde{V}_S - \tilde{Z}_1 \tilde{I}_t^B,$$

where superscript "F" stands for "forward sweep."
The forward sweep may continue at each node i until new voltages at all end nodes have been computed:

$$\tilde{V}_i^F = \tilde{V}_{i-1}^F - \tilde{Z}_i \left( \tilde{I}_t^B - \sum_{j=1}^{i-1} \tilde{I}_j^B \right).$$

After completing the forward sweep of block 610, the backward sweep may be repeated (block 604) using the new end voltages (i.e., $\tilde{V}_n^B = \tilde{V}_n^F$) rather than the assumed voltage $\tilde{V}_S$ as carried out in the first iteration of the backward sweep. The forward and backward sweeps of blocks 604 and 610 may be repeated as shown in the flowchart 600 until the calculated voltage at the source is within the tolerance ε of the specified source voltage $\tilde{V}_S$.

If the feeder 14 has laterals, the specified voltage at the substation bus, $\tilde{V}_S$, may be used as the initial voltage at the end nodes. The number of end nodes is equal to the number of the laterals of the feeder 14. The application platform for Volt/VAR optimization 18 may start at the furthest node, which may be on the main feeder 14 or on a lateral, and continue with a backward sweep until a first "junction" node (i.e., a node where the lateral branches in two directions) has been reached. At this point, the application platform for Volt/VAR optimization 18 may "jump" to the end node of the branches connected to this junction node, and may use the backward sweep until it reaches the junction node again. After the backward sweep has been performed on all branches, the number of the calculated voltages for this junction point may be understood to be equal to the number of the branches connected to the junction. The upstream bus voltage of the junction bus then may be calculated using the most recent calculated junction bus voltage and the calculated branch current between the two nodes.

The manners of performing the distribution power flow simulation described above may involve assuming that before the power flow analysis of a distribution system, the three-phase voltages at the substation 12 and the complex power at all of the loads 27, or load models, are known. However, if metering points are present along the feeder 14, it may desirable to force the computed values to match the metered input.

For example, the input complex power (kW and kVAr) to a feeder 14 may be known from the measurements 48 arriving at the application platform for Volt/VAR optimization 18 at the substation 12. This metered data in the measurements 48 may represent, for example, total three-phase power or power for each individual phase. If the input complex power to the feeder 14 computed using the iterative distribution power flow process described above does not match the measurements 48, the ratio of the measurements 48 to the computed input may be calculated, and loads 27 multiplied by this ratio. A few iterations of this iterative distribution power flow process may be used to determine a new computed input to the feeder 14. This new computed input should be closer to the metered input indicated by the measurements 48.

In general, when the application platform for Volt/VAR optimization 18 simulates the distribution power flow across various segments of the electrical distribution system, the application platform for Volt/VAR optimization 18 may follow the following process. First, the application platform for Volt/VAR optimization 18 may calculate a ratio of the metered input from the measurements 48 and the input computed in the distribution power flow process discussed above. Second, the application platform for Volt/VAR optimization 18 may carry out the iterative distribution power flow process discussed above again, repeating until the computed input falls within a tolerance of the metered input indicated by the measurements 48.

Figure 9:
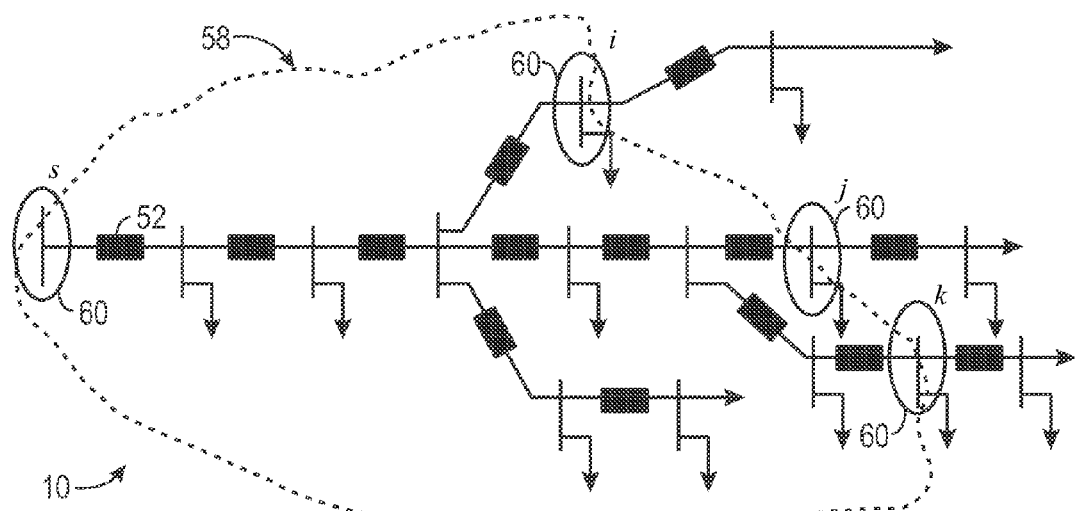
FIGS. 9-11 are schematic diagrams of measurement zones of a segment of an electrical distribution system, in accordance with an embodiment.
Figure 10:
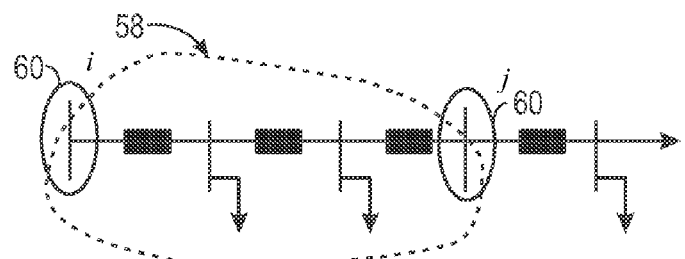
Figure 11:
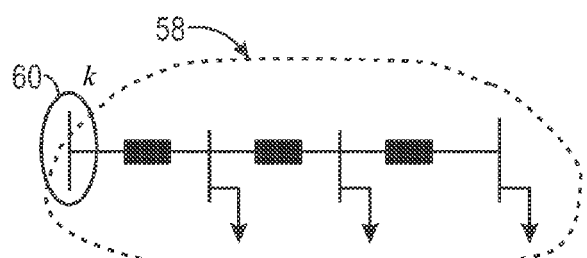

A similar process may be performed when the measurements 48 indicate metered data for other points on the feeder 14. For example, as shown by FIGS. 9-11, a distribution feeder 14 may be divided into measurement zones 58 that are bounded by end point measurements 60. These end point measurements 60 may provide, for example, accurate branch active and reactive power flow measurements, voltage magnitude, and/or phasor measurements. It should be appreciated that the end point measurements 60 may be treated as boundary constraints, and that the measurement zones 58 may contain additional measurements within. Voltage magnitudes and voltage phase angles may be treated as specified voltages at measurement buses on the feeder 14. Calculated loads 27 in each measurement zone 58 may be adjusted separately to meet boundary constraints indicated by the end point measurements 60. Note that when an end point measurement 60, providing kW and kVAr, is present on the feeder 14, only calculated loads 27 downstream from the end point measurement 60 may be modified. The distribution power flow simulation across a feeder 14 may be used to compute voltage rise $\Delta V$, active power loss reduction $\Delta P_{LOSS}$, and a new power factor that may occur when each of the distribution capacitor banks 22 of the feeder 14 is switched on or off.

Figure 12:
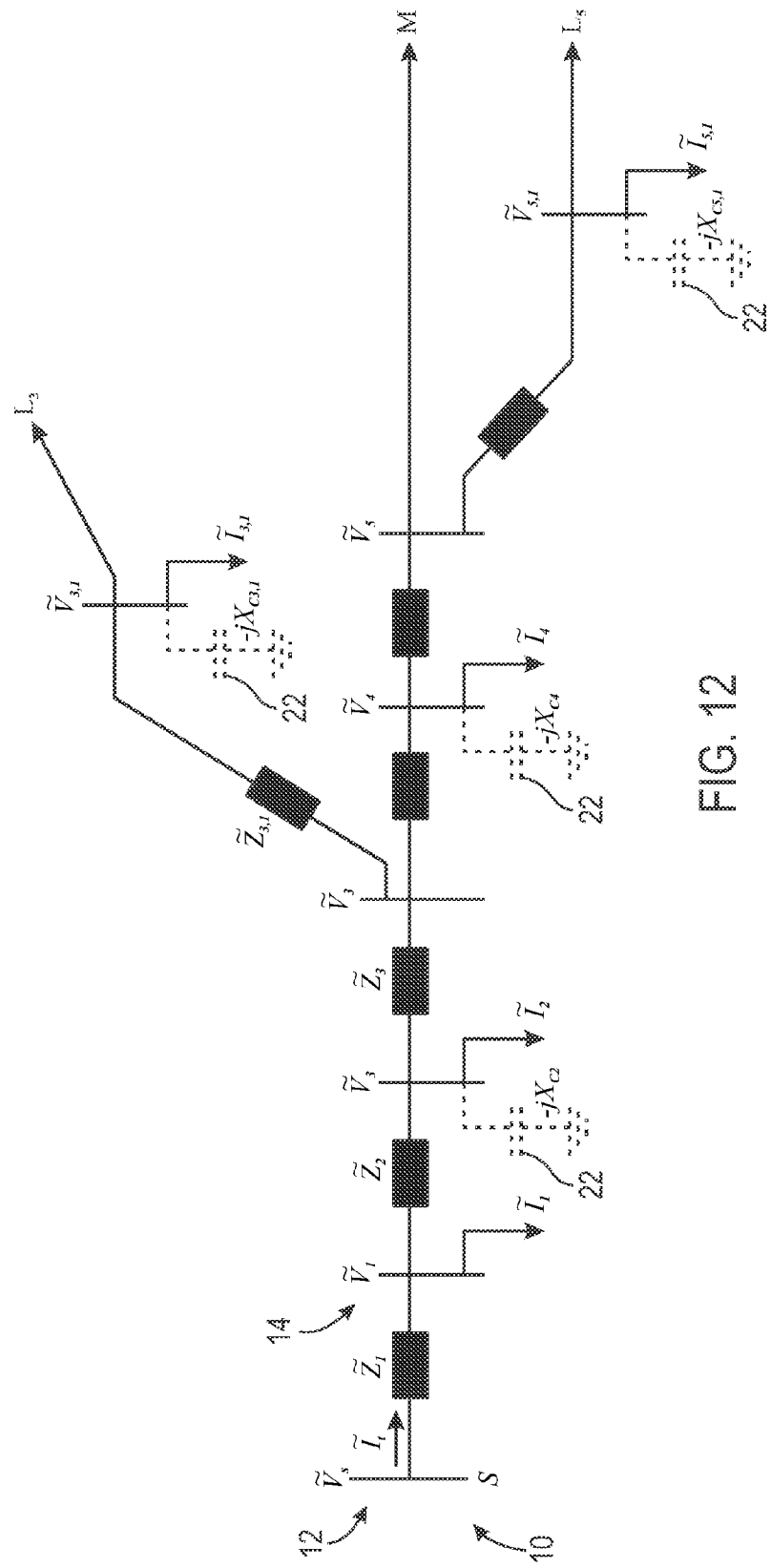
FIG. 12 is a schematic diagram representing a manner of switching distribution capacitor banks to vary the operational parameters of a segment of an electrical distribution system, in accordance with an embodiment.

The active power loss reduction $\Delta P_{LOSS}$ due to the switching on of a capacitor 22 may be approximated as the sum of the reductions in the active power losses in each line segment on the path from that capacitor 22 to the substation 12 bus (for the moment we will neglect the losses in distribution transformer). For example, as shown in FIG. 12, when a capacitor C2 is switched on, the reduction and active power losses may be represented by the following equation:

$$\Delta P_{LOSS_{C_2}} = \Delta P_{loss_{C_2}}^{S,1} + \Delta P_{loss_{C_2}}^{1,2},$$

where $$\Delta P_{loss_{C_2}}^{i,j} \approx R_{i,j} I_{X_{i,j}}^2 - R_{i,j}(I_{X_{i,j}} - I_{C_2})^2$$

represents loss reduction in line segment between nodes i and j due to capacitor $C_2$, the value $R_{i,j}$ is resistance of the line segment between nodes i and jj, and the value $$I_{X_{i,j}} = \text{Im}(\tilde{I}_{i,j})$$

is the imaginary component of the current $\tilde{I}_{i,j}$ flowing between nodes i and j.

The reduction in the active power losses $\Delta P_{LOSS}$ loss due to the addition of other capacitors 22 of the feeder 14 may be calculated in a similar way, as follows:

$$\Delta P_{LOSS_{C_4}} = \Delta P_{loss_{C_4}}^{S,1} + \Delta P_{loss_{C_4}}^{1,2} + \Delta P_{loss_{C_4}}^{2,3} + \Delta P_{loss_{C_4}}^{3,4}$$

$$\Delta P_{LOSS_{C_{3,1}}} = \Delta P_{loss_{C_{3,1}}}^{S,1} + \Delta P_{loss_{C_{3,1}}}^{1,2} + \Delta P_{loss_{C_{3,1}}}^{2,3} + \Delta P_{loss_{C_{3,1}}}^{3,31}$$

$$\Delta P_{LOSS_{C_{5,1}}} =$$

$$\Delta P_{loss_{C_{5,1}}}^{S,1} + \Delta P_{loss_{C_{5,1}}}^{1,2} + \Delta P_{loss_{C_{5,1}}}^{2,3} + \Delta P_{loss_{C_{5,1}}}^{3,4} + \Delta P_{loss_{C_{5,1}}}^{4,5} + \Delta P_{loss_{C_{5,1}}}^{5,15}$$

The power factor may also be impacted by switching on the capacitors 22 of the feeder 14. For example, the effect of switching on the capacitor C2 of FIG. 12 on the power factor at the substation 12 low side (LS) bus S may be given as follows:

$$pf_{C_2} \approx \frac{P_t - \Delta P_{LOSS_{C_2}}}{\sqrt{(P_t - \Delta P_{LOSS_{C_2}})^2 + (Q_t - \Delta Q_{LOSS_{C_2}} - Q_{C_2})^2}},$$

where $$\Delta Q_{LOSS_{C_2}} = \Delta Q_{loss_{C_2}}^{S,1} + \Delta Q_{loss_{C_2}}^{1,2}.$$

Voltage Optimization Objective Function

As will be discussed below, the application platform for Volt/VAR optimization 18 may optimize the voltage across the feeders 14 first by flattening the voltage and then by reducing it. The application platform for Volt/VAR optimization 18 may attempt to flatten the voltage profile along the feeders 14 and enable the feeders 14 to use deeper voltage reduction modes by minimizing the voltage deviations $\Delta V$ according to the following objective:

Min$\Delta V$ subject to $V_{min} \leq V_j \leq V_{max}, j = 1, \ldots, N$ $pf_{min} \leq pf \leq pf_{max}$ In the equation above, $\Delta V$ is the difference between the maximum and the minimum voltage on the feeder 14, N is the total number of feeder 14 voltage measurement points, $V_{min}$ is the minimum allowable voltage on the feeder 14 (e.g., 120V−5%, or 114V), $V_{max}$ is the maximum allowable voltage on the feeder 14 as defined in the voltage flattening (VF) function (e.g., 120V+5%, or 126V), pf is the power factor measured at the head of the feeder 14, and $pf_{min}$ and $pf_{max}$ are its lower and upper permissible limits as desired. As will be described further below, the application platform for Volt/VAR optimization 18 may determine which capacitor 22 or combinations of capacitors 22 may satisfy the above relationship. Once the application platform for Volt/VAR optimization 18 has caused the voltage deviation ΔV across the feeders 14 to be reduced, the application platform for Volt/VAR optimization 18 may cause the source voltage $V_S$ at the outset of the feeders 14 to be reduced.

Figure 13:
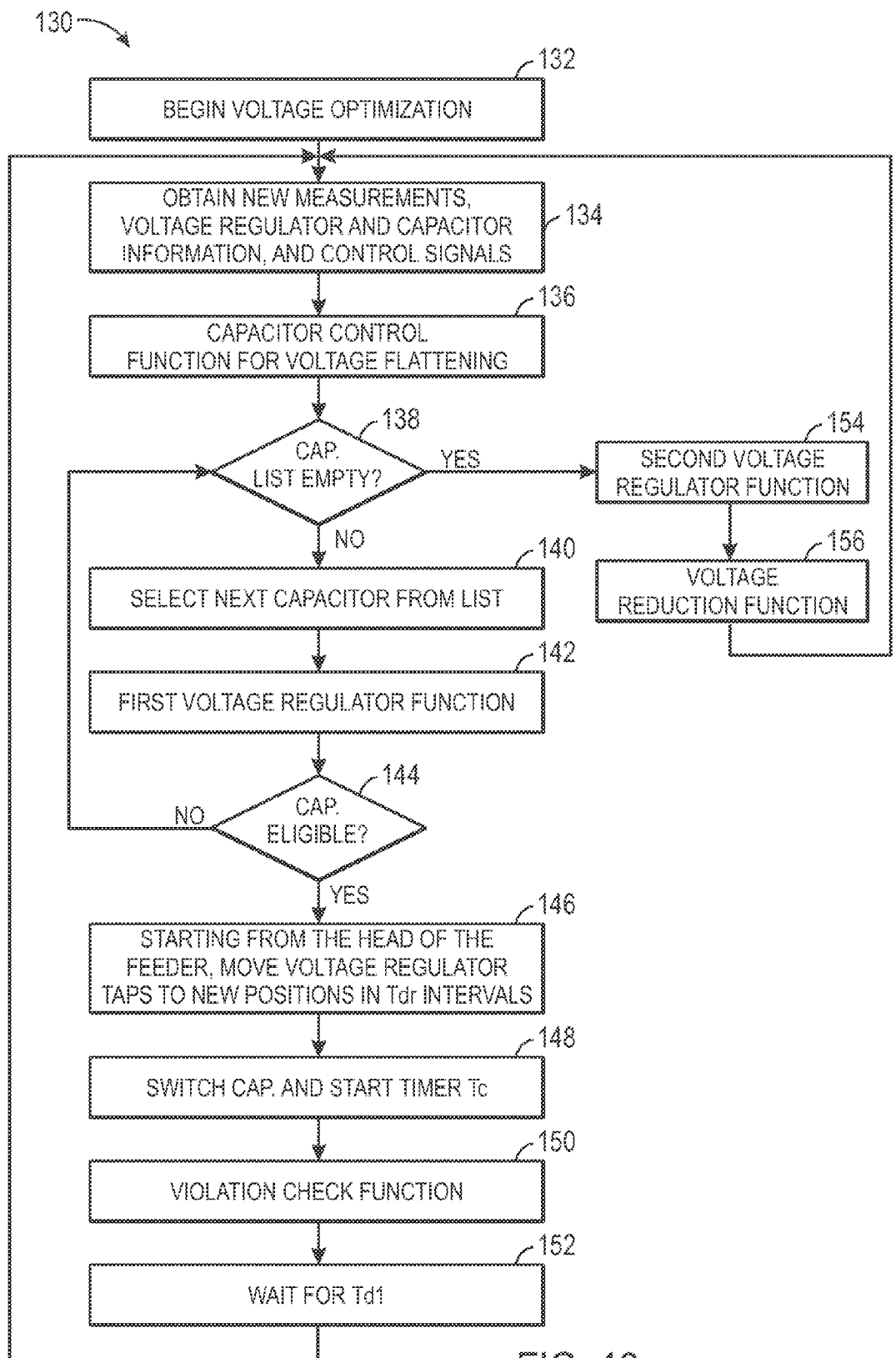
FIG. 13 is a flowchart describing an embodiment of a method for decentralized coordinated control of an electrical distribution system to optimize voltage, in accordance with an embodiment.

When a feeder 14 has a normal configuration (i.e., no anomalous conditions on the feeder 14 or restored feeder 14 segments feed from the normally configured source feeder 14), the application platform for Volt/VAR optimization 18 may carry out the voltage optimization function in the manner represented by a flowchart 130 of FIG. 13. The flowchart 130 may begin as the application platform for Volt/VAR optimization 18 starts the voltage optimization function (block 132). As such, the application platform for Volt/VAR optimization 18 may obtain measurements 48, which may include LTC transformer 16, voltage regulator (VR) 28, and capacitor 22 status and voltage information directly from remote terminal units (RTUs), from a database 49 that contains such data, or from the field (block 134).

Having obtained the measurements 48, the application platform for Volt/VAR optimization 18 may carry out a capacitor control function that optimizes voltage (block 136). This capacitor control function will be discussed in greater detail below with reference to FIGS. 18-21 below. Essentially, the capacitor control function of block 136 may return a combination of capacitors 22 or a single capacitor 22 that, when switched on or off, may optimize voltage of the feeder 14. As will be discussed below, the capacitor control function may involve simulating the feeder 14 in various configurations to determine a configuration that best matches the [parameter function] objective relationship presented above.

If the capacitor control function block 136 outputs a capacitor-switching configuration that switches on or off at least one capacitor 22 in the feeder 14 (decision block 138), the application platform for Volt/VAR optimization 138 may simulate the effects of these capacitor-switching configurations via distribution power flow simulations or by using the approximate equations. Thus, as will be discussed below, selecting from the next capacitor 22 that is available for switching in the capacitor-switching configuration (block 140), the application platform for Volt/VAR optimization 18 may perform a first voltage regulator function (block 142). An example of such a first voltage regulator function 142 is discussed in greater detail below with reference to FIG. 22. Essentially, the first voltage regulator function of block 142 involves simulating the effect on the feeder 14 of switching on or off the selected capacitor 22 to ensure that no voltage violations are expected to result. If the first voltage regulator function of block 142 indicates that the selected capacitor 22 is expected to produce a voltage violation (decision block 144), it will calculate tap point and the application platform for Volt/VAR optimization 18 may issue control signals 50 to the equipment of the feeder 14 to enact the determined configurations.

In particular, the application platform for Volt/VAR optimization 18 may first move taps of voltage regulators (VRs) 28 to new positions, as may have been calculated during the first voltage regulator function (block 142), starting from the head of the feeder 14 (block 146). The application platform for Volt/VAR optimization 18 may continue to move taps of the voltage regulators (VRs) 28 in $T_{dr}$ intervals, which may last, for example, approximately 10 s to 15 s. Next, the application platform for Volt/VAR optimization 18 may cause the selected capacitor 22 to be switched on or off and may start a timer of duration $T_c$ (block 148). The duration $T_c$ represents a capacitor switching time delay, during which time the selected capacitor 22 will not be considered available for switching. In some embodiments, $T_c$ may last at least 5 minutes. Additionally or alternatively, $T_c$ may become progressively longer as the number of times the capacitor 22 has been switched increases. For example, once the capacitor 22 has been switched on or off five times in a particular 24-hour period, the time $T_c$ may be set such that the capacitor 22 can no longer be switched for some extended duration (e.g., 24 more hours).

To ensure that the simulations performed by the application platform for Volt/VAR optimization 18 accurately predicted the effect of switching on the selected capacitor 22 on the voltage of the feeder 14, the application platform for Volt/VAR optimization 18 next may run a violation check function (block 150). The violation check function may involve monitoring the actual measurements 48 of the feeder 14 following the changes in configuration of the equipment on the feeder 14, and taking corrective measures, if appropriate. An example of such a violation check function as carried out at block 150 is described in greater detail below with reference to FIG. 24. The violation check function of block 150 may be carried out until a time delay Td1 has passed, in which $T_c \gg T_{d1}$. After the time delay $T_{d1}$, the voltage optimization function may start again, with the application platform for Volt/VAR optimization 18 obtaining new measurements at block 174.

Returning to decision block 144, if the first voltage regulator function 142 indicates that switching on the selected capacitor 22 would result in a voltage violation that could not be remedied by adjusting voltage regulator (VR) 28 taps, the process flow may return to decision block 138. If the capacitor-switching configuration includes other available capacitors 22, the application platform for Volt/VAR optimization 18 may select the next capacitor from the list of capacitors 22 (block 140) and carry out the first voltage regulator function (block 142) again.

Returning to decision block 138, it should be appreciated that any time the list of available capacitors 22 from a capacitor-switching configuration of the capacitor control function of block 136 is empty, there are no capacitors 22 of the feeder 14 that can be switched on or off to optimize voltage without causing a voltage violation (i.e. the capacitor list is empty). Under such conditions, the voltage may be considered optimized and the application platform for Volt/VAR optimization 18 may carry out a second voltage regulator function 154. The second voltage regulator function of block 154 may be used to flatten the overall voltage across the length of the feeder 14. An example of such a second voltage regulator function as carried out at block 154 is described in greater detail below with reference to FIG. 25.

Having flattened the voltage after reducing the total voltage deviation over the length of the feeder 14, the application platform for Volt/VAR optimization 18 may determine a lowest supply voltage $V_s$ that will keep all the voltages along the feeder within the bounds of acceptable values (block 156). As such, the application platform for Volt/VAR optimization 18 may also issue control signals to cause the LTC transformer 16 and/or a first voltage regulator (VR) to lower the supply voltage $V_s$. Because the supply voltage $V_s$ is lowered, the total power consumed by the loads of the feeder 14 will be reduced accordingly. Thereafter, the application platform for Volt/

VAR optimization 18 may thereafter continue to optimize voltage according to the flowchart 130.

Figure 14:
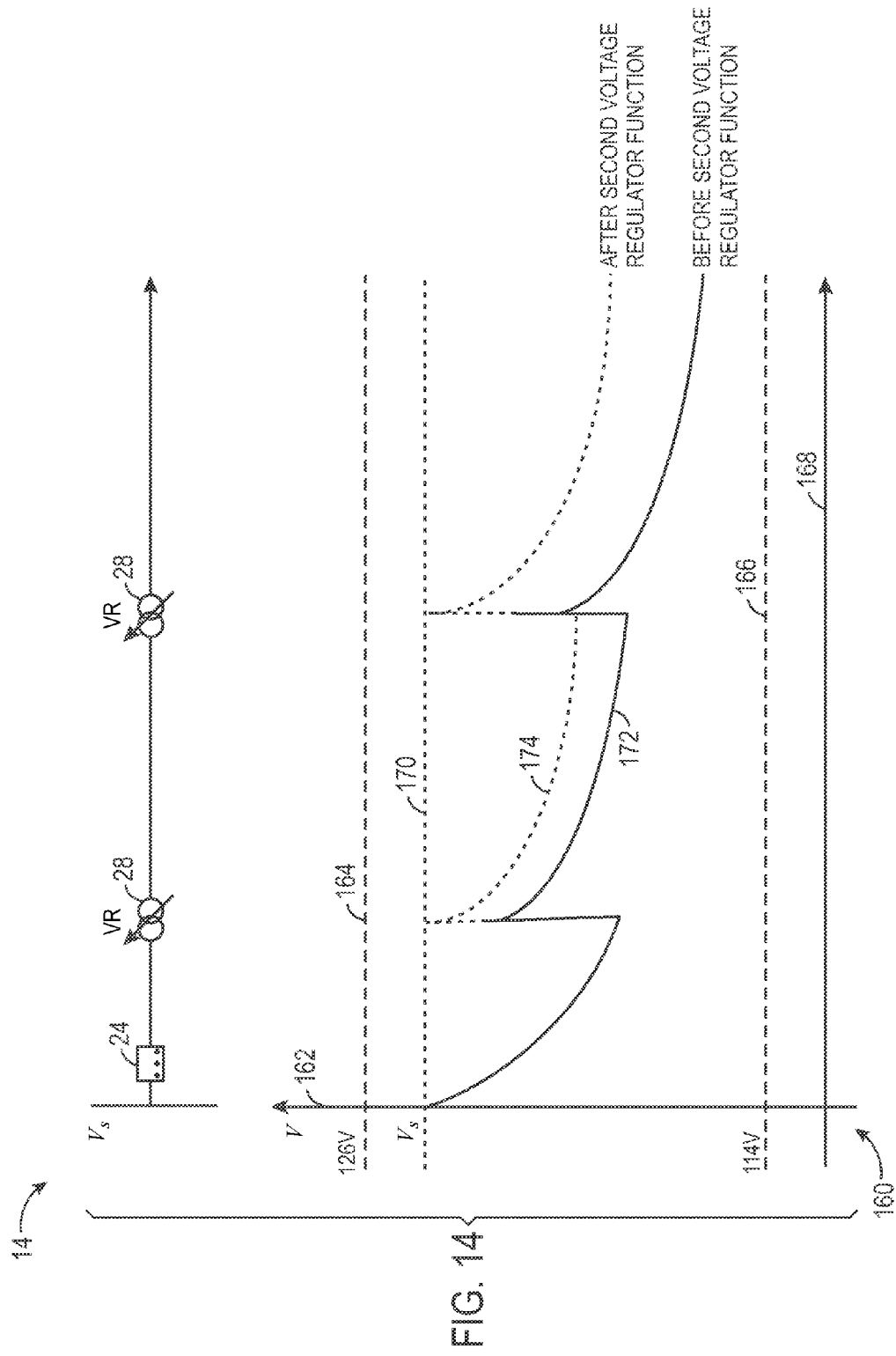
FIG. 14 is a plot modeling voltage over a segment of an electrical distribution system before and after adjusting voltage regulators in the method of the flowchart of FIG. 13, in accordance with an embodiment.

Before continuing further, the effect of carrying out the second voltage regulator function of block 154 of FIG. 13 is briefly described with reference to FIG. 14. Specifically, FIG. 14 illustrates a plot 160, which includes an ordinate 162 representing the voltage across the length of a feeder 14, as depicted above the plot 160. The voltages are delineated as falling within 120V±5%, or 126V (line 164) and 114V (line 166). An abscissa 168 represents a length of the feeder 14. As shown in FIG. 14, the feeder 14 includes two voltage regulators (VRs) 28. A curve 172 represents the voltage across the feeder 14 before the second voltage regulator function of block 154 of FIG. 13 is carried out, and a curve 174 illustrates the voltage across the length of the feeder 14 afterward. Thus, the second voltage regulator function of block 154 causes the voltage regulators (VRs) 28 to generally output the same supply voltage $V_S$ as provided at the outset of the feeder 14 on their respective high side (HS) buses.

Figure 15:
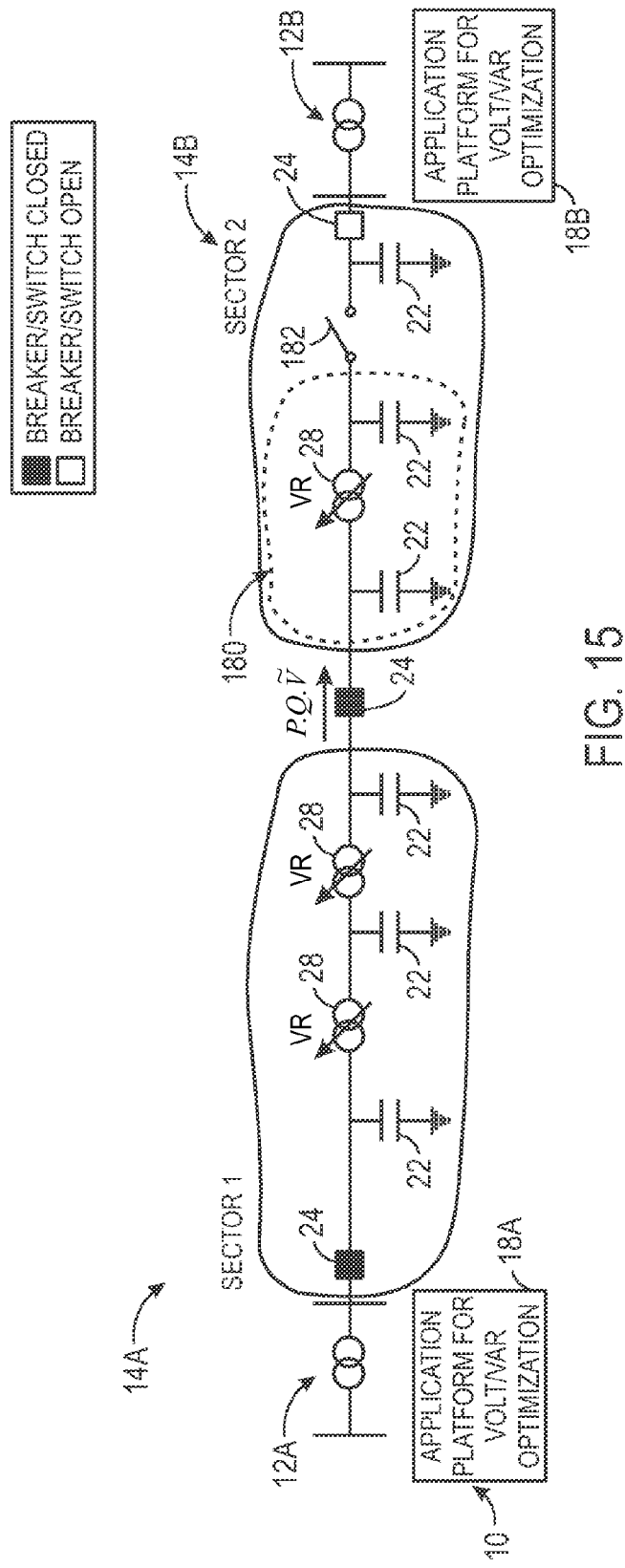
FIG. 15 is a one-line diagram illustrating a manner of supplying power from a first segment of an electrical distribution system to a restored segment of the electrical distribution system, in accordance with an embodiment.

The voltage optimization function of FIG. 13 may also be employed to optimize voltage of a normally configured feeder and a restored segment of a different feeder 14 that had been subject to a fault. For example, as shown in FIG. 15, a first feeder 14A having power supplied by a first substation 12A may supply power to a restored segment 180 of a second feeder 14B that is usually supplied by a substation 12B. As seen in FIG. 15, a breaker 24 adjoining the first feeder 14A and the restored segment 180 of the second feeder 14B is illustrated as closed. Thus, it may be understood that the first feeder 14A is supplying power to the restored segment 180 of the second feeder 14B in FIG. 15. The breaker 24 and switch 124 on the other side of the restored segment 180 of the second feeder 14B are depicted as being open. A first application platform for Volt/VAR optimization 18A may be associated with the first feeder 14A, and a second application platform for Volt/VAR optimization 18B may be associated with the second feeder 14B.

Figure 16:
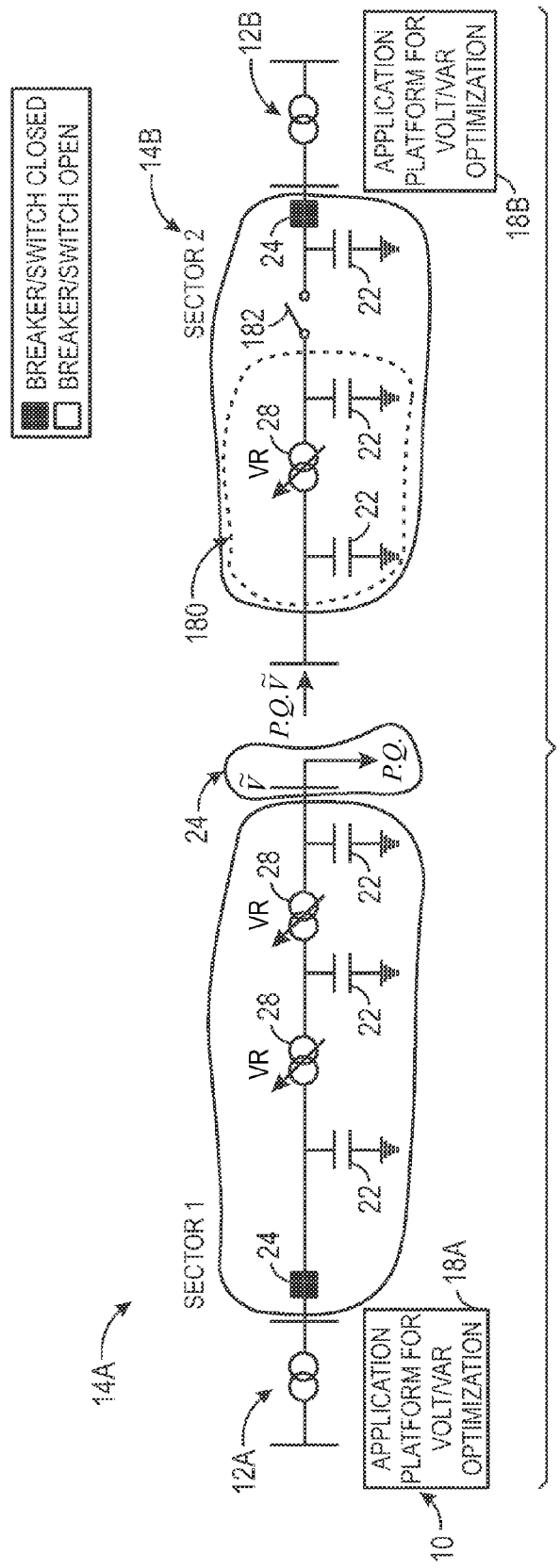
FIG. 16 is a one-line diagram representing an equivalent circuit of the one-line diagram of FIG. 15, in accordance with an embodiment.

FIG. 16 represents the circuit of FIG. 15 in equivalent form. Namely, from the perspective of the first feeder 14A, restored segment 180 of the second feeder 14B may be seen as a load 27. From the perspective of the restored segment 180 of the second feeder 14B, disconnect switch 24 is a source point that is supplying power to the restored segment 180.

Figure 17:
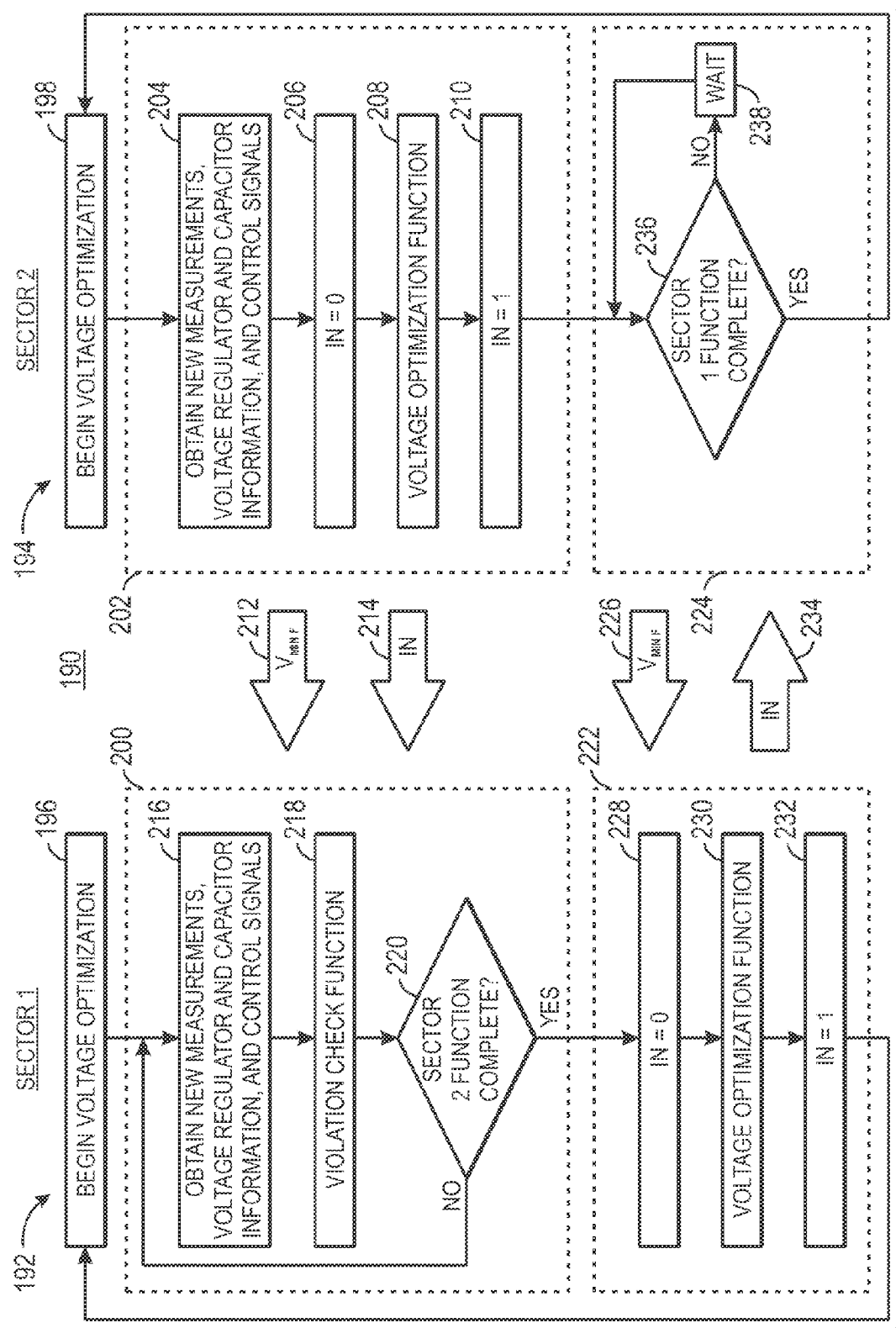
FIG. 17 is a flowchart describing an embodiment of a method for optimizing voltage across a first segment of an electrical distribution system and a restored segment of the electrical distribution system via decentralized coordinated control.

The equivalent circuit of FIG. 16 may form a basis upon which to simulate operational parameters of the feeders 14A and/or 14B for purposes of optimizing voltage. Indeed, a flowchart 190 of FIG. 17 illustrates one manner in which voltage may be optimized on both the first feeder 14A and the restored segment 180 of the second feeder 14B. The flowchart 190 of FIG. 17 may include two processes 192 and 194 that are respectively carried out by different application platform for Volt/VAR optimizations 18. That is, the process 192 may be carried out by the first application platform for Volt/VAR optimization 18A that is associated with the first feeder 14A, and the process 194 may be carried out by the second application platform for Volt/VAR optimization 18B that is associated with the second feeder 14B. The processes 192 and 194 may respectively begin with blocks 196 and 198 as the two application platforms for Volt/VAR optimization 18 carry out voltage optimization.

The first application platform for Volt/VAR optimization 18A associated with the first feeder 14A may carry out a process 200 while the second application platform for Volt/VAR optimization 18B associated with the second feeder 14B carries out a process 202. Specifically, the second application platform for Volt/VAR optimization 18B may obtain measurements 48 pertaining to the equipment of the feeder 14B, including the restored segment 180. The application platform for Volt/VAR optimization 18B may also set an indicator IN (block 206) (e.g., IN=0) to indicate that the voltage optimization function is being carried out on the feeder 14B (block 208). The voltage optimization function of block 208 may be substantially the same as discussed above with reference to flowchart 130 of FIG. 13. After the application platform for Volt/VAR optimization 18B has completed the voltage optimization function of block 208, the application platform for Volt/VAR optimization 18B may set the indicator IN to indicate that the voltage optimization is complete (block 210), (e.g., IN=1). Meanwhile, the application platform for Volt/VAR optimization 18B may occasionally publish data 212 and 214 to the application platform for Volt/VAR optimization 18A, representing a minimum voltage $V_{min}$ across the second feeder 14B and the indicator IN.

While the second application platform for Volt/VAR optimization 18B is carrying out the voltage optimization function in process 202, the first application platform for Volt/VAR optimization 18A may obtain measurements associated with the first feeder 14A (block 216) and carry out a violation check function (block 218) to ensure that the voltage optimization carried out by the second application platform for Volt/VAR optimization 18B does not cause any voltage violations on the first feeder 14A. The violation check function of block 218 may be substantially the same as the violation check function of block 150 of FIG. 13, which is discussed in greater detail below with reference to FIG. 24. If the indicator 214 indicates that the second application platform for Volt/VAR optimization 18A has not completed the voltage optimization function (decision block 220), the first application platform for Volt/VAR optimization 18A may continue to receive new measurements 48 and run the violation check function 218. Otherwise, when the second application platform 18B has completed the voltage optimization function on the second feeder 14B, the processes 192 and 194 both may progress to respectively carry out processes 222 and 224.

Namely, the second application platform for Volt/VAR optimization 18B may continue to provide the minimum voltage of the second feeder 14B, shown as data 226 while the first application platform for Volt/VAR optimization 18A carries out the process 222. That is, the first application platform for Volt/VAR optimization 18A may set an indicator IN (e.g., IN=0) (block 228) before carrying out the voltage optimization function on the first feeder 14A (block 230). When the voltage optimization function of block 230 has completed, the first application platform for Volt/VAR optimization 18A may change the indicator IN to note that the voltage optimization function of block 230 has completed (e.g., IN=1) (block 232).

Meanwhile, in the process 224, the second application platform for Volt/VAR optimization 18B may receive the indicator IN as data 234 published by the first application platform for Volt/VAR optimization 18A. As long as the data 234 suggests that the first application platform for Volt/VAR optimization 18A has not completed the voltage optimization function (e.g., IN=0) (decision block 236), the second application platform for Volt/VAR optimization 18B may continue to wait (block 238). When the data 234 indicates that the first application platform for Volt/VAR optimization 18A has completed the voltage optimization function (e.g., IN=1) (decision block 236), both the feeder 14A and the restored segment of the feeder 14B may be understood to be optimized for voltage. The flowchart 190 of FIG. 17 may repeat as desired.

Capacitor Control Function

Figure 18:
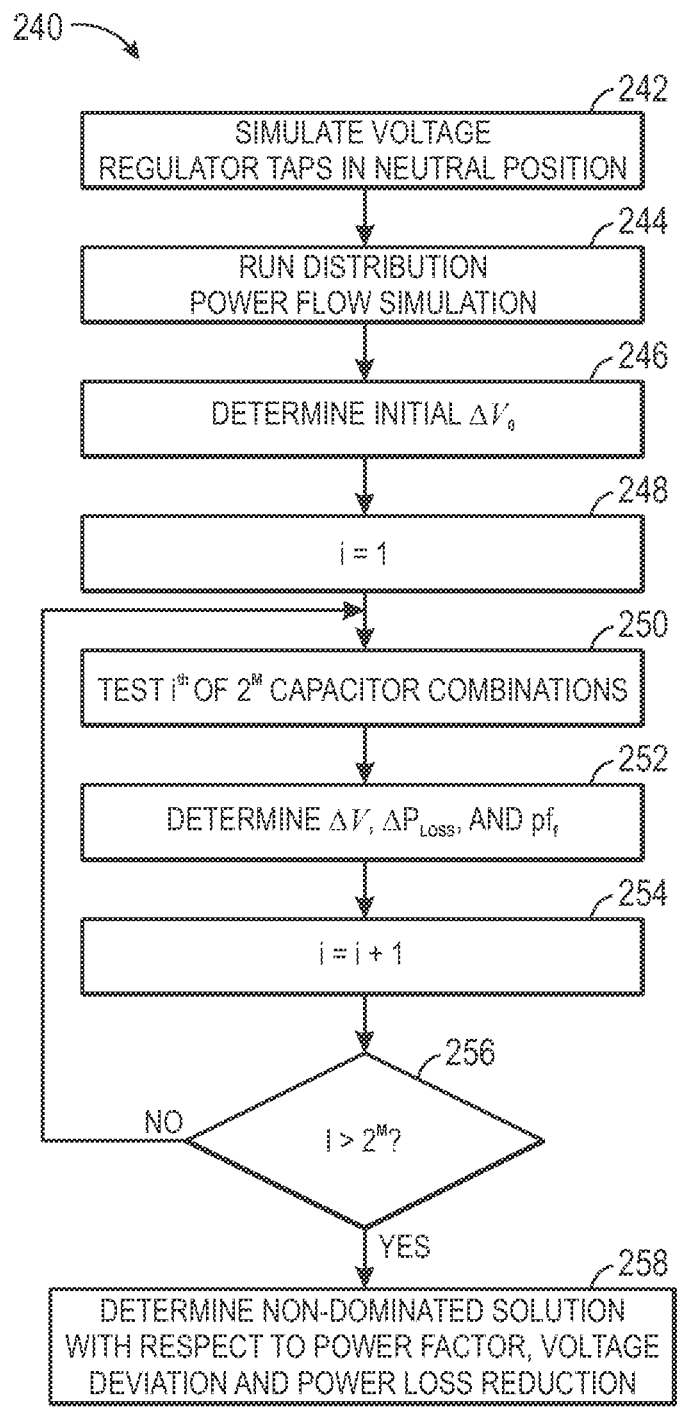
FIG. 18 is a flowchart describing an embodiment of a method for determining a combination of capacitors of an electrical distribution system that may be switched on or off to optimize voltage.
Figure 19:
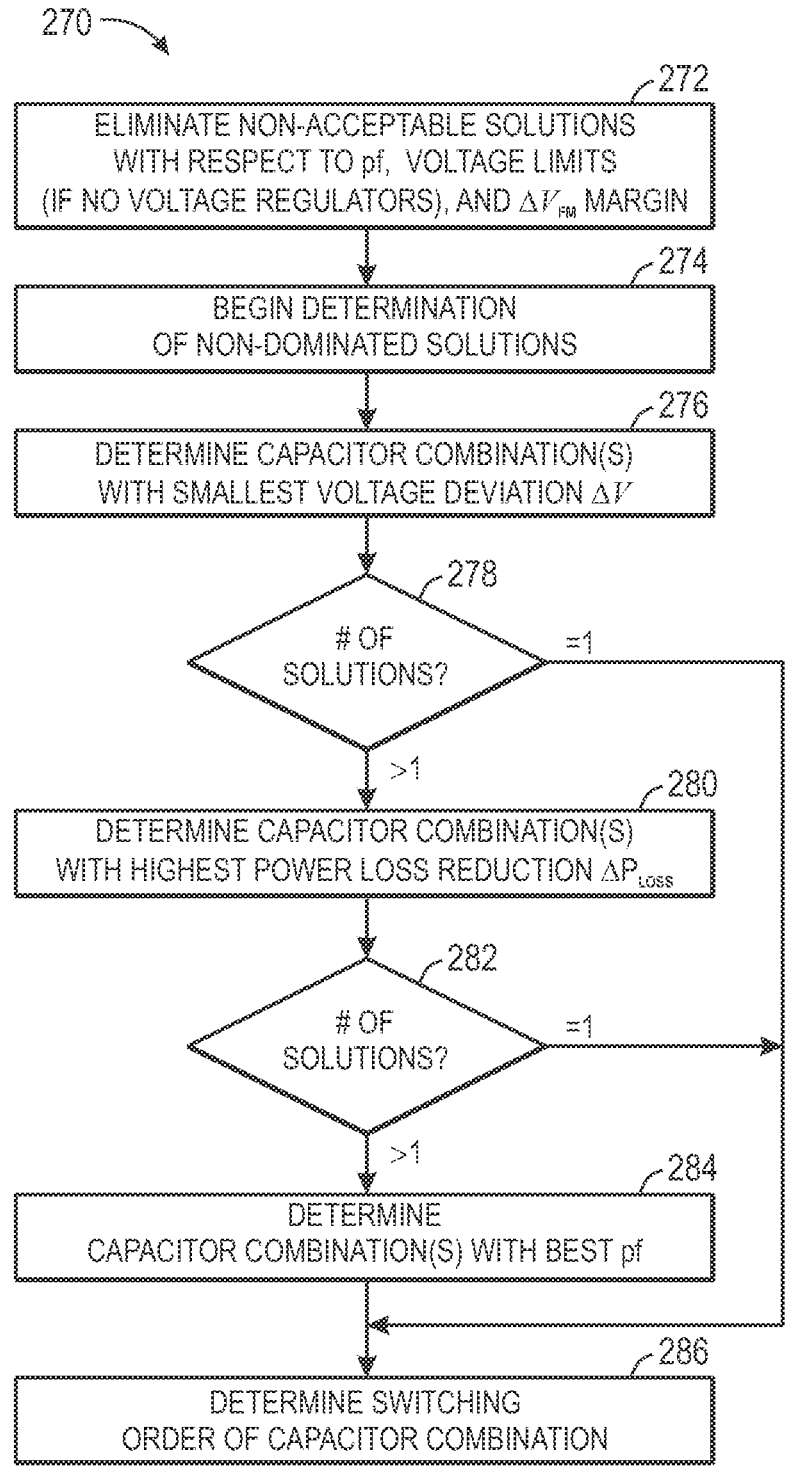
FIG. 19 is a flowchart describing an embodiment of a method for determining a non-dominated capacitor combination solution that optimizes voltage.

FIGS. 18 and 19 represent an example of a method for carrying out the capacitor control function for voltage of block 136 of FIG. 13. As mentioned above, carrying out the method of FIG. 18 may produce a list of capacitors 22 of a feeder 14 that, when switched on or off, are expected to optimize voltage on the feeder 14. In particular, FIG. 18 represents a flowchart 240 that may begin when the application platform for Volt/VAR optimization 18 simulates the taps of the voltage regulators (VRs) 28 of the feeder 14 as being in a neutral position (block 242). Under such conditions, the application platform for Volt/VAR optimization 18 may run a distribution power flow simulation in the manner discussed above with reference to FIG. 28 (block 244) or use approximate equations. Using any of the approaches, the application platform for Volt/VAR optimization 18 may determine an initial voltage deviation $\Delta V_0$, representing a baseline voltage deviation that may be used for comparison purposes later (block 246).

Next, the application platform for Volt/VAR optimization 18 may iteratively test various capacitor-switching configurations, each of which may include a particular combination of capacitors 22 of the feeder 14 switched on and/or off. Thus, the application platform for Volt/VAR optimization 18 may set a loop variable i=1 (block 248) and simulate the effect of each $i^{th}$ of $2^M$ capacitor-switching configurations of combinations of capacitors 22 (block 250). In simulating the feeder 14 with each $i^{th}$ capacitor-switching configuration, the application platform for Volt/VAR optimization 18 may determine the voltage deviation $\Delta V$ across the feeder 14, a reduction in active power losses $\Delta P_{LOSS}$, and the power factor pf of the feeder 14 (block 252). The application platform for Volt/VAR optimization 18 may increment i (block 254) and, while i is not greater than the total number of capacitor-switching configurations (i.e., $2^M$) (decision block 256), the application platform for Volt/VAR optimization 18 may continue to simulate the effect of various capacitor-switching configurations on the feeder 14. After the voltage deviation $\Delta V$, reduction in power losses $\Delta P_{LOSS}$ and power factors have been calculated for all of the capacitor-switching configurations, the application platform for Volt/VAR optimization 18 may determine a non-dominated solution that optimizes voltage (block 258).

The application platform for Volt/VAR optimization 18 may carry out block 258 of FIG. 18 in a variety of manners depending on the parameter being optimized. For example, a flowchart 270 of FIG. 19 represents one manner of carrying out block 258 of FIG. 18, which may be used to determine a non-dominated capacitor-switching configuration that optimizes voltage. The flowchart 270 may begin when the application platform for Volt/VAR optimization 18 eliminates non-acceptable solutions with respect to power factor, voltage limits (if no voltage regulators (VRs) 28 are present in the feeder 14), and voltage deviation margin (block 272). The application platform for Volt/VAR optimization 18 next may begin determining the non-dominated solutions (block 274) that may optimize voltage on the feeder 14 (block 274). Afterward, the application platform for Volt/VAR optimization 18 may determine the capacitor-switching configuration that has the smallest voltage deviation $\Delta V$ (block 276).

If more than one non-dominated solution has the smallest voltage deviation $\Delta V$ (decision block 278), the application platform for Volt/VAR optimization 18 next may determine the switching configuration capacitor with the highest power loss reduction $\Delta P_{LOSS}$ (block 280). If the number of non-dominated solutions for capacitor-switching configuration with the highest power loss reduction $\Delta P_{LOSS}$ is greater than one, the application platform for Volt/VAR optimization 18 may select the capacitor-switching configuration with the best power factor (block 284). Next, the application platform for Volt/VAR optimization 18 may determine a switching order of the capacitors 22 in the capacitor-switching configuration that produces optimal operational parameters in the feeder 14 (block 286).

Figure 20:
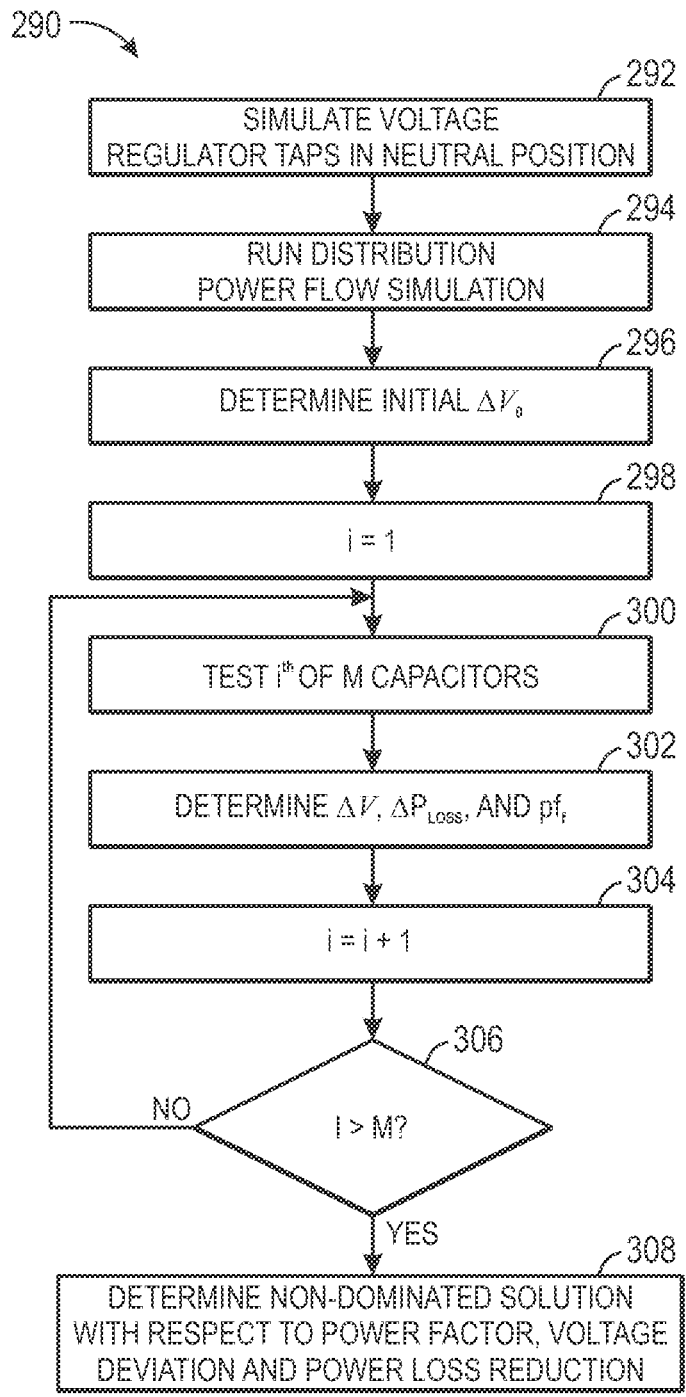
FIG. 20 is a flowchart describing an embodiment of a method for determining a capacitor that may be switched on or off to optimize voltage.

A variation of the flowchart of FIG. 18 for determining a capacitor switching configuration that optimizes voltage deviation appears as a flowchart 290 of FIG. 20. The flowchart 290 may take place in substantially the same manner as FIG. 18, with certain exceptions. In general, blocks 292-308 of FIG. 20 may take place in the same manner as blocks 242-258 of FIG. 18, except that blocks 300 and 306 of FIG. 20 are different from blocks 250 and 256 of FIG. 18. Specifically, in block 300 of the example of FIG. 20, the effect of a change in a single capacitor 22, rather than a combination of capacitors 22, may be determined Thus, as indicated by decision block 306 of FIG. 20, the number of tests may be reduced to M iterations rather than $2^M$ iterations, where M represents the number of capacitors 22 that can be switched in the feeder 14.

Figure 21:
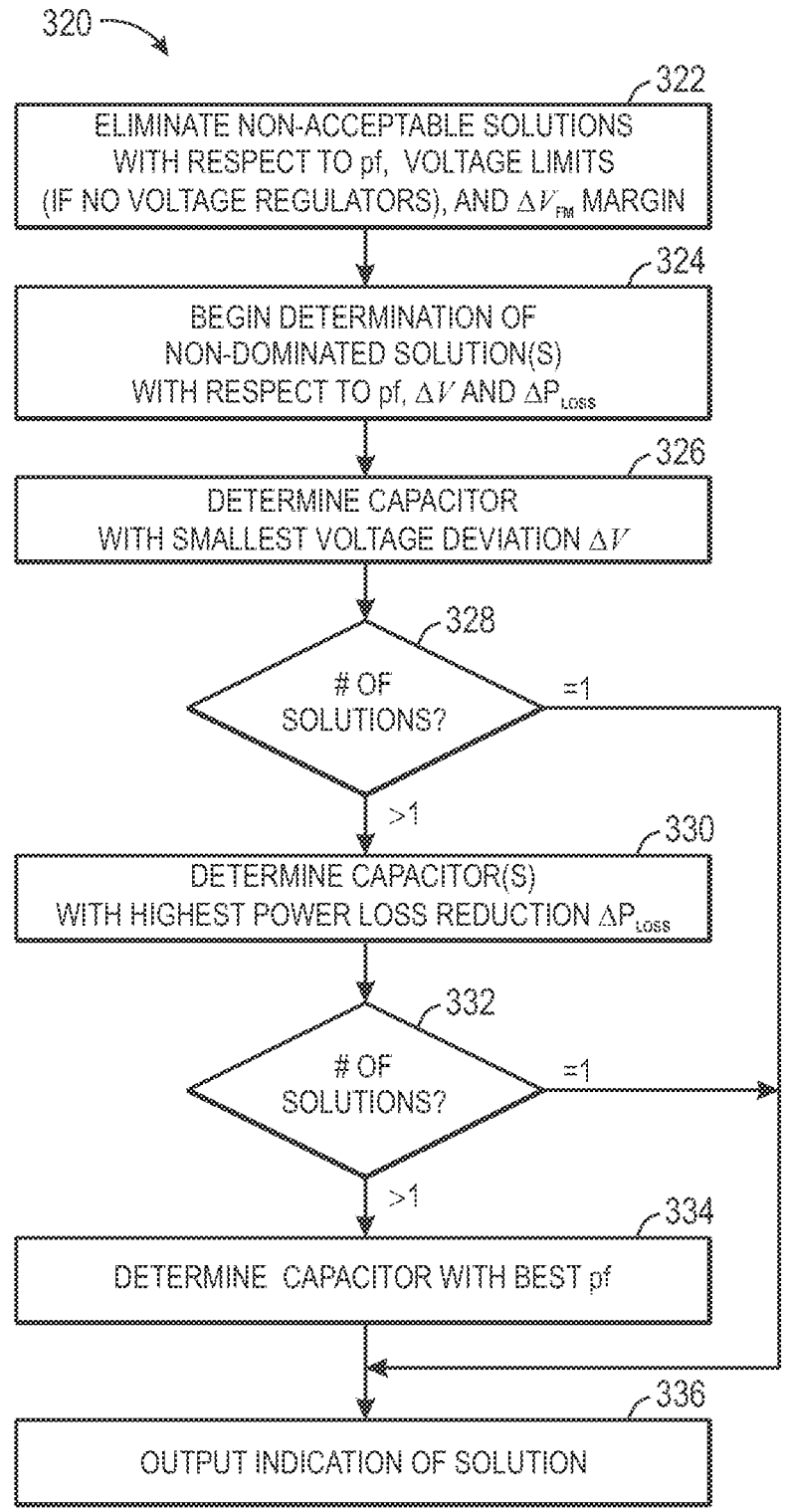
FIG. 21 is a flowchart describing an embodiment of a method for determining a non-dominated capacitor solution that optimizes voltage.

Likewise, FIG. 21 provides a flowchart 320 that is similar to the flowchart 270 of FIG. 19 for determining a non-dominated solution that optimizes the voltage deviation of the feeder 14. That is, blocks 322-336 of FIG. 21 generally correspond to blocks 272-286 of FIG. 19, with certain exceptions. For example, because the method of the flowchart 320 of FIG. 21 relates to determining a non-dominated solution involving switching only one capacitor 22, the non-dominated solution selected by the flowchart 320 may represent the switching of only one capacitor 22. For the same reason, there is no need to determine a switching order of capacitors 22.

Figure 22:
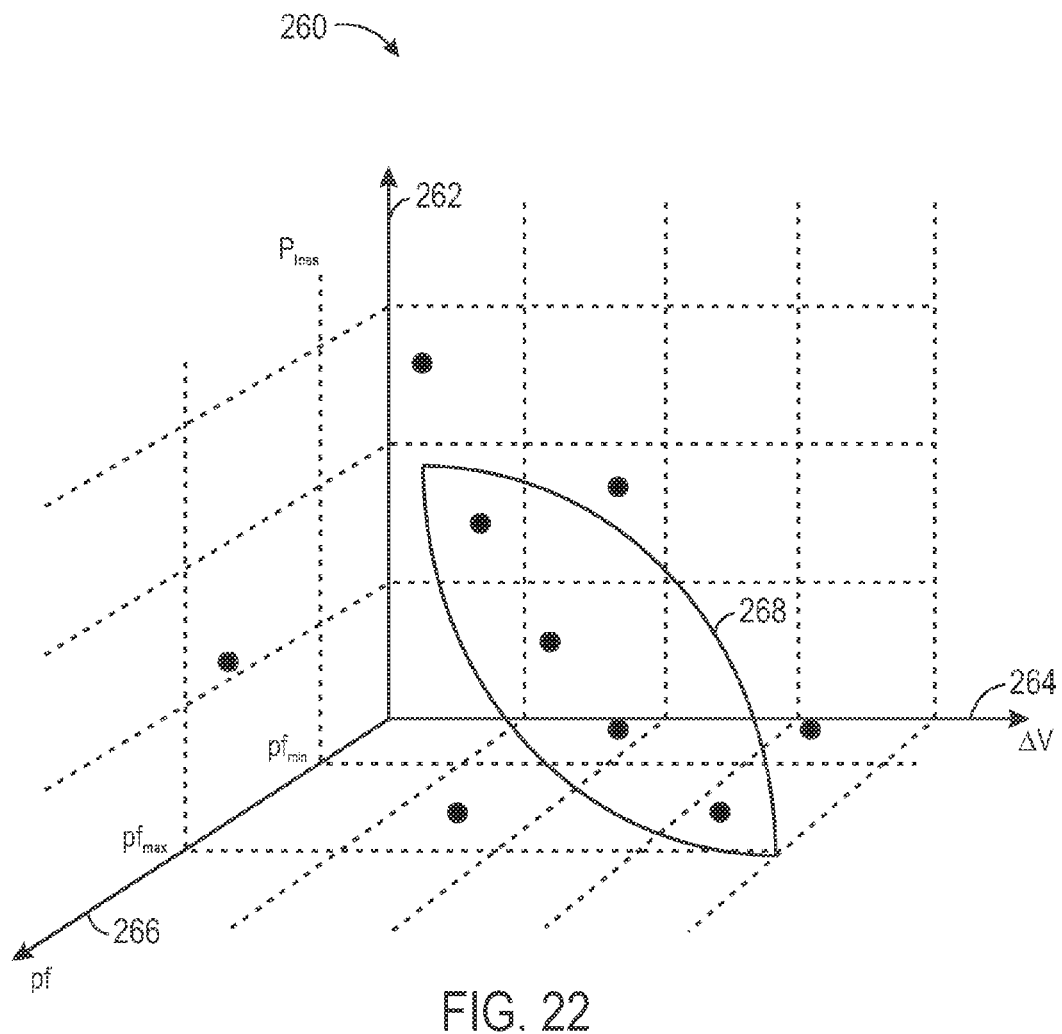
FIG. 22 is a plot representing a number of solutions that optimize voltage in 3-D space.

A 3-D plot 260 shown in FIG. 22 represents various solutions for voltage deviation $\Delta V$, power loss $P_{LOSS}$, and power factor for various capacitor-switching configuration combinations, as generally may be determined in blocks 252 of the flowchart 240 of FIGS. 18 and 302 of the flowchart 290 of FIG. 20. In the 3-D plot 260, a first axis 262 represents power losses $P_{LOSS}$, a second axis 264 represents voltage deviation $\Delta V$, and a third axis 266 represents power factor (PF). A 3-D solution space 268 represents a 3-D boundary, within which various solutions for capacitor-switching configurations may produce acceptable results. It should be appreciated that, from such a range of acceptable solutions as may be found within the 3-D solution space 268 a non-dominated solution may be determined that optimizes voltage while offering the greatest active power loss reduction and/or most desirable power factor for the feeder 14.

As described above with reference to FIG. 13, the application platform for Volt/VAR optimization 18 may carry out a first voltage regulator function at block 142, a violation check function at block 150, and a second voltage regulator function at block 154. These functions will now be described in greater detail below.

First Voltage Regulator Function

Figure 23:
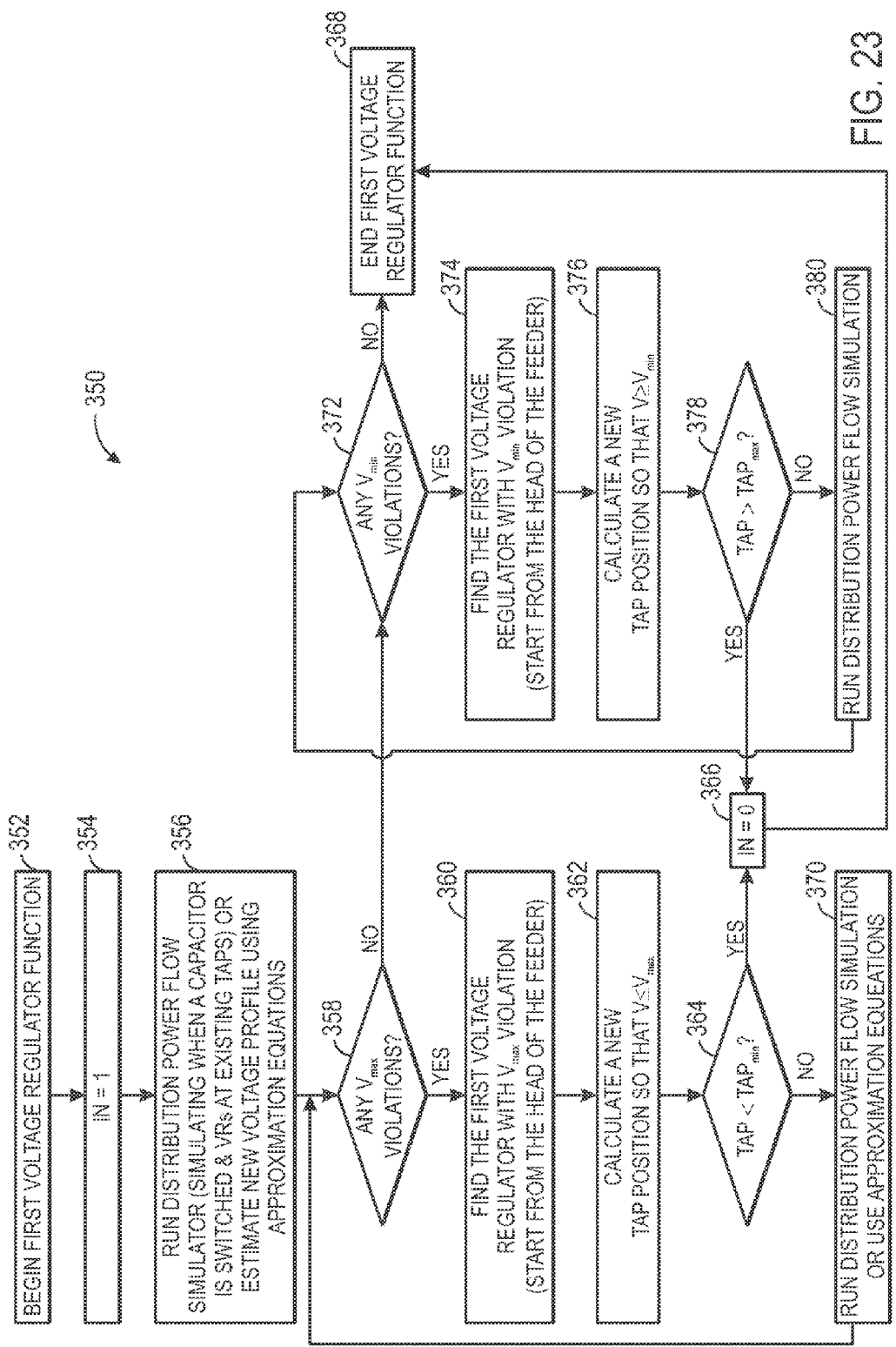
FIG. 23 is a flowchart describing an embodiment of a method for determining and responding when switching is expected to cause a voltage violation on the segment of the electrical distribution system.

One example of the first voltage regulator function that may be carried out at block 142 of FIG. 13 appears as a flowchart 350 in FIG. 23. To carry out the first voltage regulator function of block 142 of FIG. 13, the application platform for Volt/VAR optimization 18 may begin the function (block 352), and set an indicator IN to a default value (e.g., IN=1) (block 354). The application platform for Volt/VAR optimization 18 then may run a distribution power flow simulation of the feeder 14 that simulates when a particular capacitor 22 is switched on or off and simulating the voltage regulators (VRs) 28 at their current taps (block 356) or use approximate equations to estimate the new voltage profile. If a maximum voltage on the feeder 14 exceeds a desired value (e.g., $V_{max}$>126V) (decision block 358), the voltage regulators (VRs) 28 may be adjusted to cause the maximum voltage to be reduced, if possible. In particular, the application platform for Volt/VAR optimization 18 may iteratively adjust the voltage regulators (VRs) 28, starting with the first voltage regulator (VR) 28 that has a maximum voltage violation, starting from the head of the feeder 14 (block 360). The application platform for Volt/VAR optimization 18 may calculate a different tap position for the first voltage regulator (VR) 28 such that the new voltage of the first voltage regulator (VR) 28 is less than the maximum allowable voltage $V_{max}$ (block 362).

If the tap position calculated at block 362 is not feasible because it falls lower than the capabilities of the first voltage regulator (VR) 28 (decision block 364), the application platform for Volt/VAR optimization 18 may indicate (block 366) that the selected capacitor 22 cannot be switched without a voltage violation (e.g., IN=0), and the first voltage regulator function may end (block 368). If instead the tap position calculated at block 362 is a feasible tap position for the voltage regulator (VR) 28 (decision block 364), the application platform for Volt/VAR optimization 18 may run the distribution power flow simulation once more (block 370), continuing to search for voltage violations.

Returning to decision block 358, when no maximum voltage violation is determined to occur anywhere on the feeder 14 (decision block 358), the application platform for Volt/VAR optimization 18 may ascertain whether any minimum voltage violations occur across the feeder 14 (decision block 372). If no minimum voltage violations are simulated to occur on the feeder 14 (e.g., $V_{min} \geq 114V$), the first voltage regulator function may end (block 368) while the indicator IN is set to indicate that the selected capacitor 22 can be switched on without a voltage violation (e.g., IN=1).

If a minimum voltage on the feeder 14 falls beneath a desired value (e.g., $V_{min} < 114V$) (decision block 372), the voltage regulators (VRs) 28 may be adjusted to cause the minimum voltage to be increased, if possible. In particular, the application platform for Volt/VAR optimization 18 may iteratively adjust the voltage regulators (VRs) 28, starting with the first voltage regulator (VR) 28 that has a minimum voltage violation, starting from the head of the feeder 14 (block 374). The application platform for Volt/VAR optimization 18 may calculate a different tap position for the first voltage regulator (VR) 28 such that the new voltage of the first voltage regulator (VR) 28 is greater than the minimum allowable voltage $V_{min}$ (block 376).

If the tap position calculated at block 376 is not feasible because it is higher than the capabilities of the first voltage regulator (VR) 28 (decision block 378), the application platform for Volt/VAR optimization 18 may indicate (block 366) that the selected capacitor 22 cannot be switched without a voltage violation (e.g., IN=0), and the first voltage regulator function may end (block 368). If instead the tap position calculated at block 362 is a feasible tap position for the voltage regulator (VR) 28 (decision block 378), the application platform for Volt/VAR optimization 18 may run the distribution power flow simulation once more (block 380) or use approximation method for determining the voltage profile, continuing to search for voltage violations.

Violation Check Function

Figure 24:
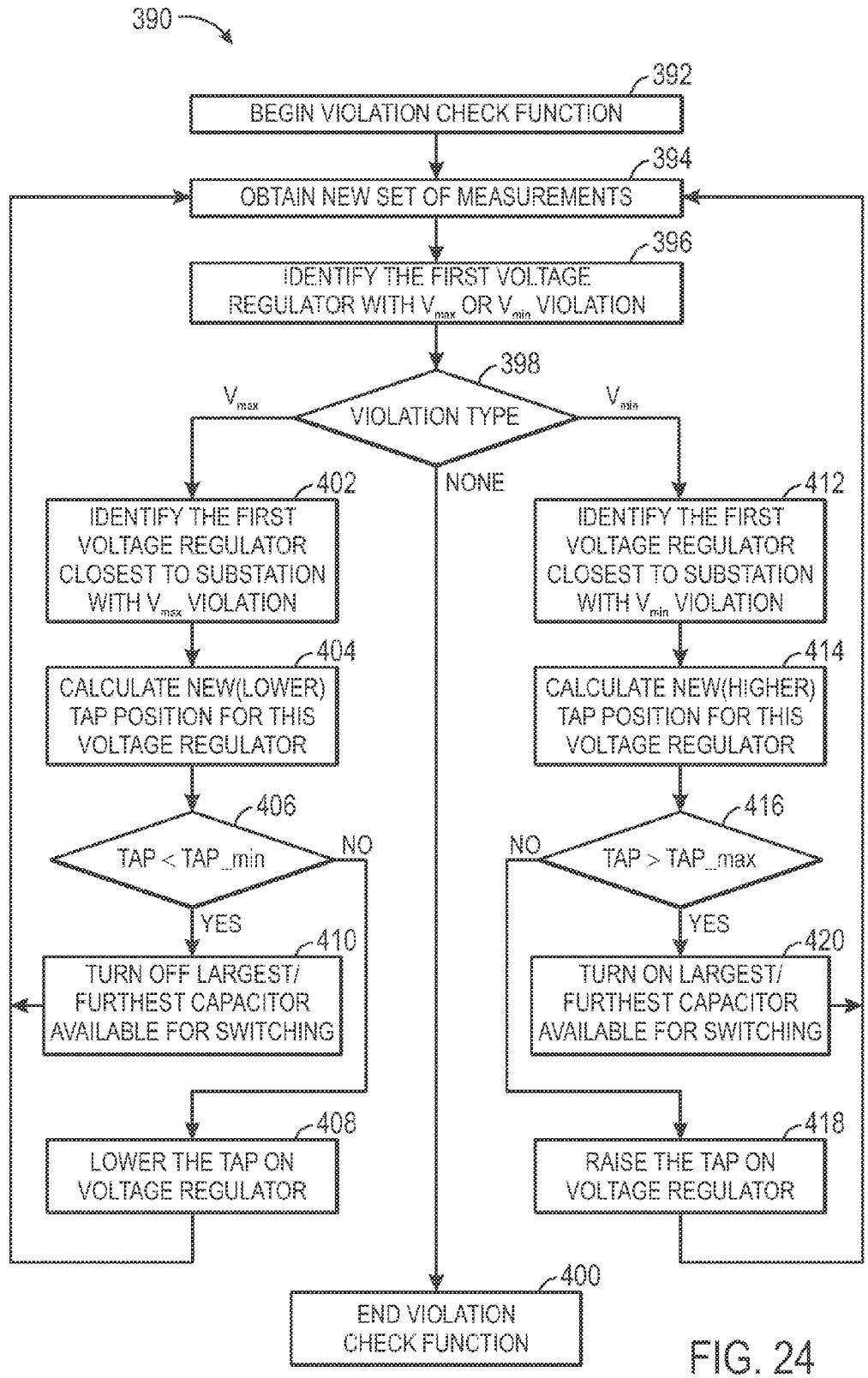
FIG. 24 is a flowchart describing an embodiment of a method for detecting and/or correcting any voltage violation that occurs when a capacitor is switched on or off.

A flowchart 390 of FIG. 24 represents an example of the violation check function of block 150 in FIG. 13, which represents a component of the voltage optimization function. Recalling that the violation check function of FIG. 24 may take place after a capacitor 22 has been switched at block 148 of FIG. 13, the violation check function of flowchart 390 may verify that no voltage violations have occurred after the capacitor 22 has been switched or, if a voltage violation has occurred occur, the violation check function of flowchart 390 may take corrective action to mitigate the violations. The flowchart 390 may begin when the application platform for Volt/VAR optimization 18 starts to carry out the violation check function (block 392) and obtains a new set of measurements 48 of the feeder 14 (block 394). The new set of measurements 48 obtained by the application platform for Volt/VAR optimization 18 at block 394 may be used by the application platform for Volt/VAR optimization 18 to search for any voltage regulators (VRs) 28 that exhibit a maximum voltage or minimum voltage violation (block 396). If no voltage violation is found (decision block 398), the application platform for Volt/VAR optimization 18 may end the violation check function (block 400).

In the event that switching the capacitor 22 at block 148 of FIG. 13, the flowchart 390 of FIG. 24 that represents an example of the block 150 of FIG. 13 may cause the application platform for Volt/VAR optimization 18 to undertake corrective measures. If a maximum voltage violation has occurred (decision block 398), the application platform for Volt/VAR optimization 18 first may identify the voltage regulator (VR) 28 nearest to the substation 12 exhibiting a maximum voltage violation (block 402). The application platform for Volt/VAR optimization 18 may calculate a new, lower tap position associated with the voltage regulator (VR) 28 (block 404). If the calculated tap position is feasible (i.e., the calculated tap position is not lower than the minimum tap position available at the voltage regulator (VR) 28) (decision block 406), the application platform for Volt/VAR optimization 18 may output a control signal 50 to cause the voltage regulator (VR) 28 to lower its tap to that calculated at block 404 (block 408). The application platform for Volt/VAR optimization 18 then may continue to verify that no other voltage violations exist on the feeder 14, beginning again by obtaining a new set of measurements 48 (block 394). On the other hand, if the calculated tap position is not feasible (i.e., the calculated tap position is lower than a minimum available tap position of the voltage regulator (VR) 28) (decision block 406), the application platform for Volt/VAR optimization 18 may output a controller signal 50 to turn off the largest capacitor 22 of the feeder 14 and/or furthest capacitor 22 from the substation 12 (block 410).

If a minimum voltage violation has occurred (decision block 398), the application platform for Volt/VAR optimization 18 first may identify the voltage regulator (VR) 28 nearest to the substation 12 exhibiting a minimum voltage violation (block 412). The application platform for Volt/VAR optimization 18 may calculate a new, higher tap position associated with the voltage regulator (VR) 28 (block 414). If the calculated tap position is feasible (i.e., the calculated tap position is not higher than the maximum tap position available at the voltage regulator (VR) 28) (decision block 416), the application platform for Volt/VAR optimization 18 may output a control signal 50 to cause the voltage regulator (VR) 28 to raise its tap to that calculated at block 414 (block 418). The application platform for Volt/VAR optimization 18 then may continue to verify that no other voltage violations exist on the feeder 14, beginning again by obtaining a new set of measurements 48 (block 394). On the other hand, if the calculated tap position is not feasible (i.e., the calculated tap position is higher than a maximum available tap position of the voltage regulator (VR) 28) (decision block 416), the application platform for Volt/VAR optimization 18 may output a controller signal 50 to turn on the largest capacitor 22 of the feeder 14 and/or furthest capacitor 22 from the substation 12 (block 420).

Second Voltage Regulator Function

Figure 25:
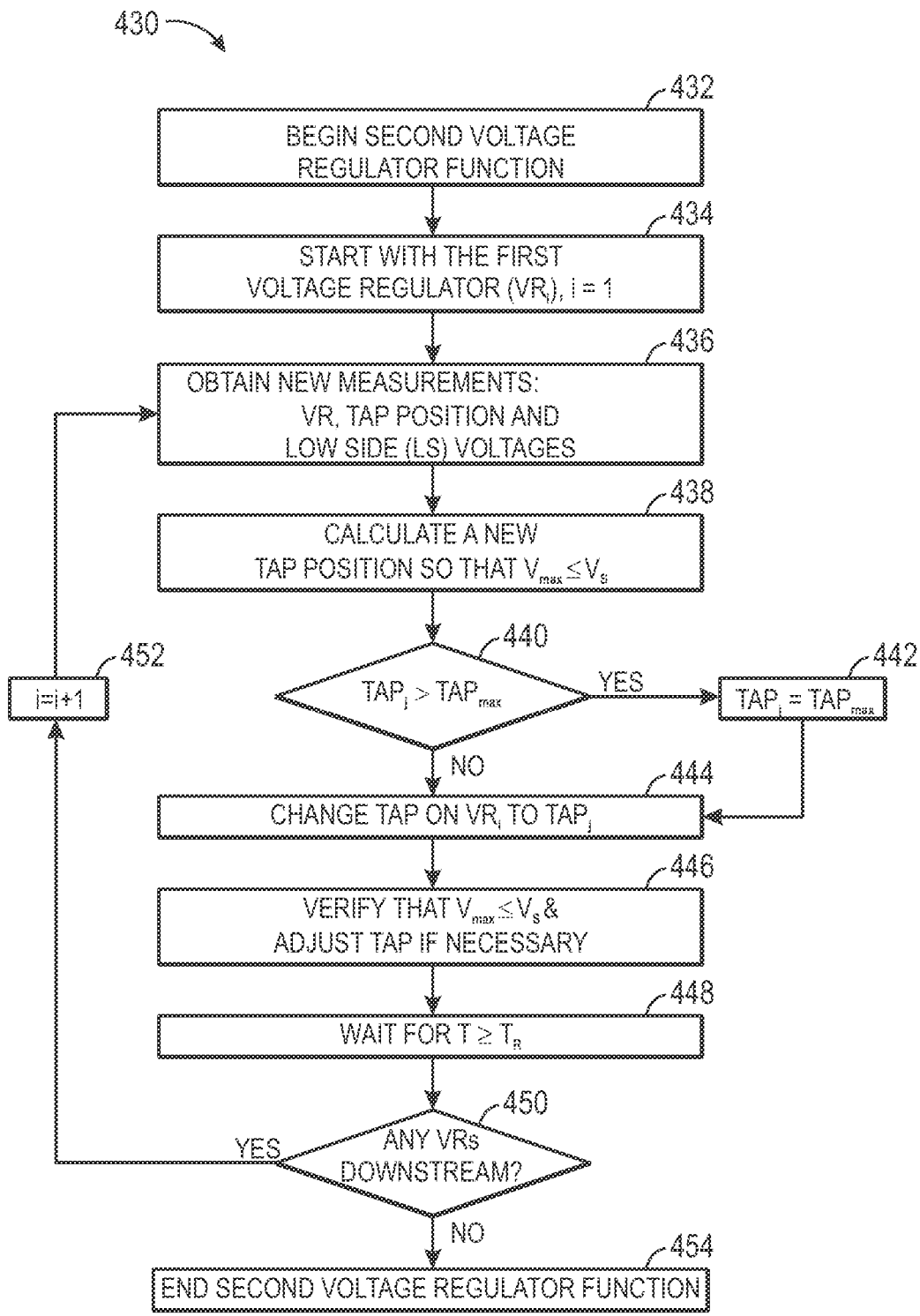
FIG. 25 is a flowchart describing an embodiment of a method for adjusting voltage regulators across a segment of an electrical distribution system after voltage has been optimized.

A flowchart 430 of FIG. 25 represents an example of the second voltage regulator function carried out by the application platform for Volt/VAR optimization 18 at block 154 of FIG. 13. As discussed above, this second voltage regulator function may cause the voltage regulators (VRs) 28 across the feeder 14 to maintain, to a great extent, a low-side (LS) bus output that is equal to the source voltage $V_S$. The flowchart 430 of FIG. 25, which represents an example of this second voltage regulator function, may begin when the application platform for Volt/VAR optimization 18 starts the second voltage regulator function (block 432) and considers each voltage regulator (VR) 28 of the feeder 14 iteratively (block 434). In particular, the application platform for Volt/VAR optimization 18 may begin with a first voltage regulator (VR) 28 (e.g., $VR_i$), where initially i=1.

The application platform for Volt/VAR optimization 18 next may obtain new measurements 48 associated with the voltage regulator (VR) 28 being considered ($VR_i$) (block 436). In particular, the application platform for Volt/VAR optimization 18 may receive measurements 48 indicating the current tap position of the voltage regulator (VR) 28 being considered ($VR_i$) as well as low-side (LS) and low-side (LS) bus voltages of the voltage regulator (VR) 28 being considered ($VR_i$).

The application platform for Volt/VAR optimization 18 may calculate a new tap position for the voltage regulator (VR) 28, such that the maximum voltage of the voltage regulator (VR) 28 being considered ($VR_i$) approaches the source voltage (block 438). If the calculated tap position exceeds a maximum tap position capability of the voltage regulator (VR) 28 being considered ($VR_i$) (decision block 440), the application platform for Volt/VAR optimization 18 may set the tap position to the maximum tap position (block 442). Otherwise, the application platform for Volt/VAR optimization 18 may change the tap position of the voltage regulator (VR) 28 being considered ($VR_i$) to the tap position calculated at block 438 (block 444).

Having caused the voltage regulator (VR) 28 being examined ($VR_i$) to switch tap positions (if necessary), the application platform for Volt/VAR optimization 18 may receive new measurements 48 to verify that the maximum voltage has not exceeded the source voltage, adjusting the tap position of the voltage regulator (VR) 28 being examined ($VR_i$) as needed (block 446). After waiting some time delay period $T_R$ (block 448), the application platform for Volt/VAR optimization 18 may determine whether any further voltage regulators (VRs) 28 are present downstream of the most recently examined voltage regulator (VR) 28 ($VR_i$) (decision block 450). If so, the application platform for Volt/VAR optimization 18 may increment the value i (block 452) and calculate once more a new tap position for the downstream voltage regulator (VR) 28 ($VR_i$) now being examined in the manner described above. Otherwise (decision block 450), the application platform for Volt/VAR optimization 18 may end the second voltage regulator function (block 454). When the second voltage regulator function ends at block 454, the maximum voltage of the voltage regulators (VRs) 28 of the feeder 14 should be close to the source voltage $V_s$ without exceeding it.

Voltage Reduction Function

Figure 26:
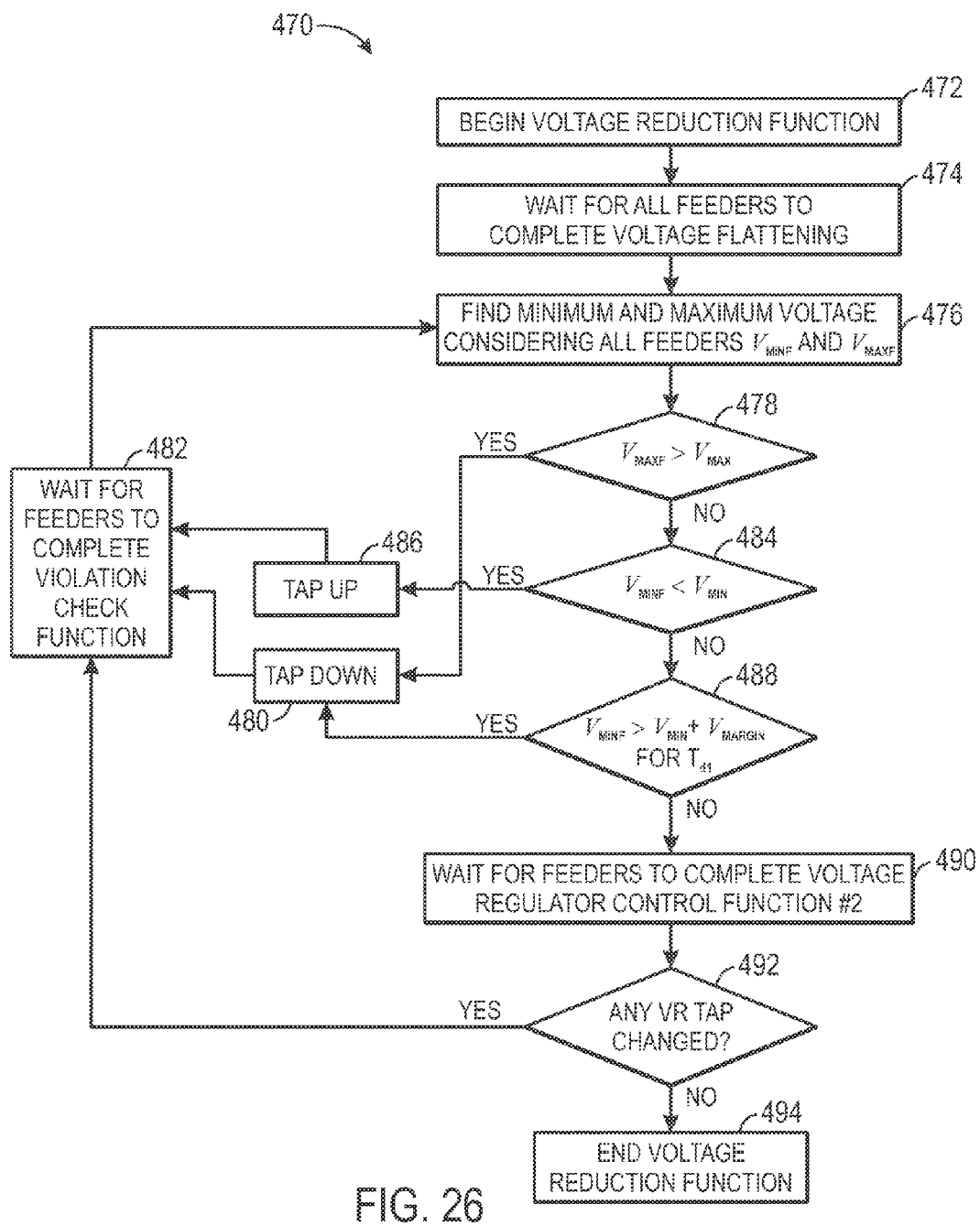
FIG. 26 is a flowchart describing an embodiment of a method for reducing the voltage supplied by a substation to various segments of an electrical distribution system after the voltage has been flattened across the segments.

As noted above, when the voltage optimization function of FIG. 13 is run, the voltage across the feeder 14 may be reduced after it has been flattened via the voltage reduction function of block 156 of FIG. 13. A flowchart 470 of FIG. 26 represents one example of this voltage reduction function undertaken at block 156 of FIG. 13. The flowchart 470 of FIG. 26 may begin as the application platform for Volt/VAR optimization 18 starts the voltage reduction function (block 472), waiting until the application platform for Volt/VAR optimization 18 has performed the voltage flattening function as to all feeders associated with the substation 12 (block 474). Once the voltage flattening function applied across the feeders 14 have completed, the application platform for Volt/VAR optimization 18 may determine the maximum and minimum voltages of all the feeders using measurements 48 (block 476). If any of the maximum voltages of the feeders 14 exceeds a maximum acceptable voltage (decision block 478), the application platform for Volt/VAR optimization 18 may cause the LTC 16 to tap down (block 480), and may wait for the violation check function for all of the feeders 14 to complete (block 482). Otherwise, the application platform for Volt/VAR optimization 18 may determine whether the minimum voltage of any of the feeders 14 falls beneath a minimum acceptable voltage $V_{min}$ (decision block 484). If so, the application platform for Volt/VAR optimization 18 may cause the LTC 16 to tap up (block 486), before waiting for the violation check function for all of the feeders 14 to complete (block 482). Note that any successive tap changes should not exceed a predefined number of taps (e.g., 8 taps which is equivalent to 5% voltage change).

If the lowest measured voltages on all of the feeders 14 are such that the minimum is greater than the minimum plus a voltage margin, for a period longer than some configurable time delay TD1 (decision block 488), the application platform for Volt/VAR optimization 18 may cause the LTC transformer 16 to tap down (block 480), continuing to do so until the minimum voltage present on the feeders 14 approaches the minimum acceptable voltage $V_{min}$. Note that any successive tap changes should not exceed a predefined number of taps (e.g., 8 taps which is equivalent to 5% voltage change).

The application platform for Volt/VAR optimization 18 may thereafter wait for the second voltage regulator function to be completed for all feeders 14 (block 490). If the second voltage regulator function results in any voltage regulator (VR) 28 tap changes occurring (decision block 492), the application platform for Volt/VAR optimization 18 may wait for the violation check function for all of the feeders 14 to complete (block 482) before returning to block 476 of the flowchart 470. Otherwise, the voltage reduction function may end (block 494).

Figure 27:
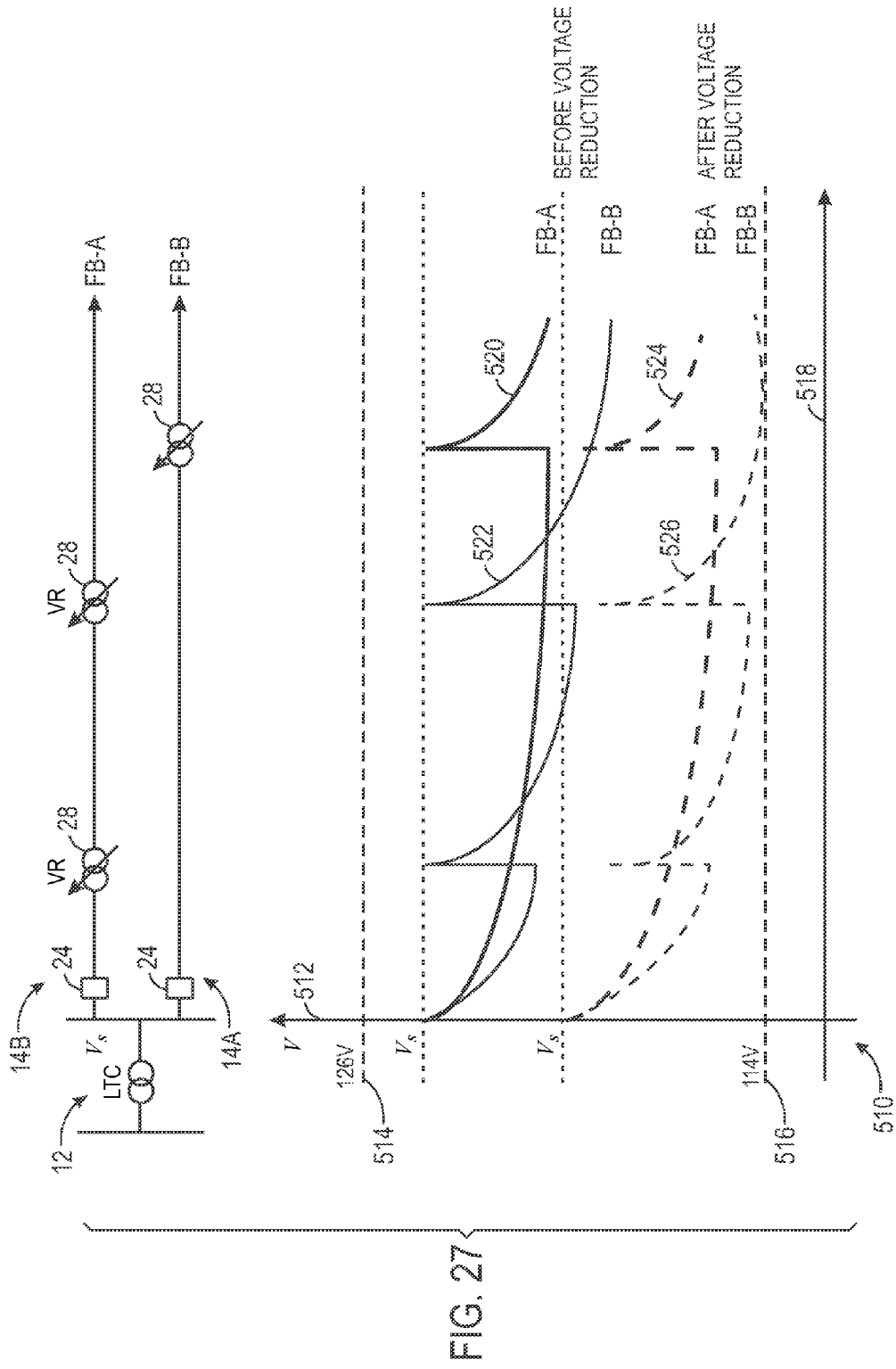
FIG. 27 is a plot illustrating the reduction of the voltage across the segments of the electrical distribution system, in accordance with an embodiment.

As shown by a plot 510 of FIG. 27, the voltage reduction function of FIG. 26 may effectively reduce the source voltage $V_S$ to the greatest extent possible. The plot 510 of FIG. 27 includes an ordinate 512 representing voltage along the feeders 14A and 14B, shown above the plot 510. These voltages extend between a maximum acceptable voltage $V_{max}$ at numeral 514, represented as 126 volts, and a minimum voltage $V_{min}$ represented at numeral 516 as 114 volts. An abscissa 518 represents the length of the feeders 14. As shown in the plot 510, curves 520 and 522 represent the voltage level across the first feeder 14A and second feeder 14B, respectively, before the voltage reduction function of FIG. 26 is carried out. Curves 524 and 526, on the other hand, represent the voltage levels across the length of the feeders 14A and 14B, respectively, after performing the voltage reduction function of FIG. 26. As can be seen, the curve 524 is lower than the corresponding curve 520, and the curve 526 is lower than the corresponding curve 522. At all times, however, the curves 524 and 526 remain above the minimum acceptable voltage at numeral 516.

Technical effects of the present disclosure include, among other things, improved voltage flattening and reduction on a segment of an electrical distribution system. Thus, according to embodiments of the present disclosure, loads of an electrical distribution system may consume less power from the segment of the electrical distribution system. In addition, the voltage control of a restored segment of an electrical distribution system can also be undertaken using the same control functions used to control a normally configured segment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A first controller configured to provide decentralized coordinated control over a first segment of an electrical distribution system supplied by a first substation while a second controller is providing decentralized coordinated control over a second segment of the electrical distribution system supplied by a second substation, the first controller comprising:

a network interface configured to receive first measurements associated with the first segment of the electrical distribution system and transmit a control signal configured to control equipment of the first segment of the electrical distribution system, wherein the first controller is configured not to control equipment of the second segment of the electrical distribution system supplied by the second substation that is controlled by the second controller; and data processing circuitry configured to run first simulation of the first segment of the electrical distribution system simulating various equipment configurations based at least in part on the first measurements, to select from among the various equipment configurations an equipment configuration that is expected to cause a voltage deviation of the first segment of the electrical distribution system to approach a desired value, and generate the control signal, wherein the control signal is configured to cause the equipment of the first segment of the electrical distribution system to conform to the equipment configuration but not to control equipment of the second segment;

wherein the network interface is configured to communicate with the second controller at least during a time the first segment is providing power to a recovered portion of the second segment providing decentralized coordinated control, and wherein the data processing circuitry comprises structure to control the equipment of the first segment based at least partly on communication with the second controller at least during the time the first segment is providing power to the recovered portion of the second segment.

2. The controller of claim 1, wherein the control signal is configured to control the equipment of the first segment of the electrical distribution system, wherein the equipment comprises at least one capacitor, and wherein the data processing circuitry is configured to run simulation of the first segment of the electrical distribution system simulating various equipment configurations, wherein the various equipment configurations comprise various capacitor switching configurations, and wherein the data processing circuitry is configured to select from among the various capacitor switching configurations a capacitor switching configuration that is expected to cause the voltage deviation of the first segment of the electrical distribution system to approach the desired value.

3. The controller of claim 2, wherein the capacitor switching configuration indicates that a single one of a plurality of capacitors of the first segment of the electrical distribution system is to be switched on or off.

4. The controller of claim 2, wherein the capacitor switching configuration indicates that a combination of a plurality of capacitors of the first segment of the electrical distribution system are to be switched on or off.

5. The controller of claim 4, wherein the data processing circuitry is configured to determine a switching order of the combination of the plurality of capacitors.

6. The controller of claim 1, wherein the network interface is configured to obtain the first measurements from a plurality of remote terminal units, wherein the first measurements comprise:

a voltage magnitude at a low side bus of the first substation of the first segment of the electrical distribution system;

a voltage magnitude at capacitors of the first segment of the electrical distribution system;

a voltage magnitude at lowside of voltage regulators of the first segment of the electrical distribution system;

tap positions of the first segment voltage regulators;

real and reactive power flows at the first segment capacitors and at all junction points between the first segment capacitors and the first segment voltage regulators and the first substation;

real and reactive power flows at a high side bus of the substation or real and reactive power flows from each feeder of the first segment of the electrical distribution system, or both;

real and reactive demand from each commercial or industrial, or commercial and industrial, load between the first substation and any of the first segment capacitors; and end of line voltages of the first segment of the electrical distribution system or a voltage drop between a last measurement point and an end of a feeder.

7. The controller of claim 1, wherein the data processing circuitry is configured to determine a plurality of operational parameters of the first segment of the electrical distribution that are expected to vary depending on the various equipment configurations, wherein the plurality of operational parameters comprises the voltage deviation over the first segment of the electrical distribution system and:

a power factor of the first segment of the electrical distribution system; or a reduction in power losses over the first segment of the electrical distribution system; or both.

8. The controller of claim 7, wherein the data processing circuitry is configured to determine, after determining the equipment configuration that is expected to cause the voltage deviation of the first segment of the electrical distribution system to approach the desired value, a reduced supply voltage that is lower than a normal supply voltage to the first segment of the electrical distribution system and that is not expected to result in a voltage violation when the equipment of the first segment of the electrical distribution system conforms to the equipment configuration.

9. The controller of claim 7, wherein the data processing circuitry is configured to select the equipment configuration from among the various equipment configurations by:

selecting one or more first equipment configurations that are expected to cause the voltage deviation to most closely approach the desired value from among the various equipment configurations;

selecting one or more second equipment configurations that are expected to cause active power losses to be reduced the most from among the one or more first equipment configurations; and selecting a final equipment configuration that is expected to cause a power factor to most closely approach a desired value from among the one or more second equipment configurations.

10. The controller of claim 1, wherein the data processing circuitry is configured to run second digital simulations of the first segment of the electrical distribution system based at least in part on the selected equipment configuration before generating the control signal to determine whether the selected equipment configuration is expected to cause a voltage violation on the first segment of the electrical distribution system and, when the selected equipment configuration is expected to cause the voltage violation, to determine a tap position for a voltage regulator of the first segment of the electrical distribution system that is expected to prevent the voltage violation from occurring.

11. The controller of claim 1, wherein the network interface is configured to receive second measurements associated with the first segment of the electrical distribution system a period of time after transmitting the control signal, wherein the second measurements reflect an actual effect of the equipment configuration on the first segment of the electrical distribution system, and wherein the data processing circuitry is configured to determine whether the second measurements indicate a voltage violation and, when the second measurements indicate the voltage violation, to vary the equipment configuration to prevent the voltage violation.

12. The controller of claim 11, wherein the data processing circuitry is configured, when the second measurements indicate the voltage violation, to identify a voltage regulator of the first segment of the electrical distribution system that is situated closest to the first substation of the electrical distribution system, to calculate a lower or higher tap position associated with the voltage regulator that is expected to prevent the voltage violation and, when the tap position is not higher than a maximum tap position or lower than a minimum tap position, to cause the voltage regulator to assume the tap position and, when the tap position is higher than the maximum tap position or lower than the minimum tap position, to cause a switchable capacitor of the first segment of the electrical distribution system that is located furthest from the first substation of the electrical distribution system or that is the largest capacitor of the first segment of the electrical distribution system to be switched on or off.

13. The controller of claim 1, wherein the data processing circuitry is configured, after transmitting the control signal, to cause one or more voltage regulators of the first segment of the electrical distribution system to cause a high side voltage of the one or more voltage regulators to be approximately equal to a low side voltage of a substation that supplies voltage to the first segment of the electrical distribution system.

14. A method for controlling first and second segments of an electrical distribution system while the first segment is providing power to a recovered portion of the second segment, using respective first and second application platforms, comprising:

running a voltage control function on the second segment using the second application platform, wherein the voltage control function is configured to cause a voltage deviation over the second segment to approach a desired value; using the first segment to provide power to the recovered portion;

while the second application platform is running the voltage control function on the second segment, running a violation check function on the first segment using the first application platform, wherein the violation check function is configured to prevent or mitigate a voltage violation on the first segment; and after running the voltage control function on the second segment using the second application platform, running the voltage control function on the first segment using the first application platform, wherein the voltage control function is configured to cause a voltage deviation of the first segment to approach the desired value.

15. The method of claim 14, comprising communicating a minimum voltage of the second segment from the second application platform to the first application platform while the first application platform is running the violation check function on the first segment or while the first application platform is running the voltage control function on the first segment, or both.

16. The method of claim 14, comprising communicating from the second application platform to the first application platform an indication that the second application platform has finished running the voltage control function when the second application platform has finished running the voltage control function and communicating from the first application platform to the second application platform an indication that the first application platform has finished running the voltage control function when the first application platform has finished running the voltage control function.

17. The method of claim 14, comprising, while the first application platform is running the voltage control function on the first segment, running a violation check function on the second segment using the second application platform, wherein the violation check function is configured to prevent or mitigate a voltage violation on the second segment.

18. An article of manufacture comprising:

one or more tangible, non-transitory machine-readable storage media having instructions encoded thereon for execution by a processor of a first electronic device, the instructions configured to perform equipment control over a first feeder supplied by a first substation of an electrical distribution system without controlling a second feeder supplied by a second substation of the electrical distribution system that is being controlled by a second electronic device, the instructions comprising:

instructions to receive measurements associated with the first feeder of the electrical distribution system;

instructions to simulate a distribution power flow of the first feeder according to various capacitor switching configurations of at least one capacitor of the first feeder using the measurements;

instructions to determine an expected voltage deviation, reduction in power loss, and power factor associated with the various capacitor switching configurations based at least in part on the simulated distribution power flow of the first feeder;

instructions to select a non-dominated capacitor switching configuration from among the various capacitor switching configurations in which the voltage deviation most closely approaches a certain value;

instructions to control capacitors of the first feeder according to the non-dominated capacitor switching configuration but not to control any equipment of the second feeder; and instructions to coordinate with the second electronic device by receiving information relating to the second feeder from the second electronic device at least during a time the first feeder is providing power to a recovered portion of the second feeder.

19. The article of manufacture of claim 18, wherein the instructions to simulate a distribution power flow of the first feeder comprise instructions to simulate an effect of distributed generation on the first feeder.

20. The article of manufacture of claim 18, comprising instructions to transmit at least one of the measurements to the second electronic device associated with the second feeder of the electrical distribution system.

* * * * *